(12) United States Patent
Michael et al.

(10) Patent No.: US 9,894,016 B2
(45) Date of Patent: Feb. 13, 2018

(54) DATA PROCESSING DEVICE AND DATA PROCESSING METHOD

(71) Applicant: SONY CORPORATION, Minato-ku (JP)

(72) Inventors: Lachlan Michael, Saitama (JP); Satoshi Okada, Tokyo (JP); Muhammad Nabil Sven Loghin, Tokyo (JP)

(73) Assignee: SONY CORPORATION, Tokyo (JP)

( * ) Notice: Subject to any disclaimer, the term of this patent is extended or adjusted under 35 U.S.C. 154(b) by 235 days.

(21) Appl. No.: 14/494,108

(22) Filed: Sep. 23, 2014

(65) Prior Publication Data

US 2015/0156141 A1 Jun. 4, 2015

Related U.S. Application Data

(60) Provisional application No. 61/911,807, filed on Dec. 4, 2013.

(51) Int. Cl.
| | |
|---|---|
| *H04L 12/939* | (2013.01) |
| *H04W 4/06* | (2009.01) |
| *H04L 1/00* | (2006.01) |
| *H04N 19/66* | (2014.01) |
| *H04N 19/68* | (2014.01) |

(52) U.S. Cl.
CPC .......... *H04L 49/552* (2013.01); *H04L 1/0042* (2013.01); *H04N 19/66* (2014.11); *H04N 19/68* (2014.11); *H04W 4/06* (2013.01)

(58) Field of Classification Search
CPC ............ H04N 21/2362; H04N 21/6112; H04L 1/0003; H04L 27/2601; H04L 1/004; H04L 1/0009
See application file for complete search history.

(56) References Cited

U.S. PATENT DOCUMENTS

2009/0245426 A1* 10/2009 Ratnakar ............... H04L 1/0045
375/327
2011/0103300 A1* 5/2011 Vare .................... H04N 21/6112
370/328
(Continued)

FOREIGN PATENT DOCUMENTS

| EP | 3 197 172 A1 | 7/2017 |
| JP | 2013-520035 A | 5/2013 |

OTHER PUBLICATIONS

ETSI EN 302 307 V1.2.1 (Aug. 2009), Digital Video Broadcasting (DVB); Second generation framing structure, channel coding and modulation systems for Broadcasting, Interactive Services, News Gathering and other broadband satellite applications (DVB-S2) 1-78 pages.*

(Continued)

*Primary Examiner* — Romani Ohri
(74) *Attorney, Agent, or Firm* — Oblon, McClelland, Maier & Neustadt, L.L.P.

(57) ABSTRACT

A data processing device includes a splitter in which an input stream made up of a plurality of packets is split, so as to generate split streams of a plurality of channels, of which the smallest increment is base band frames (BBFs) where the packets of the input stream are placed in consecutive order in a data field of the BBF which is the object of forward error correction (FEC).

5 Claims, 20 Drawing Sheets

(56) References Cited

U.S. PATENT DOCUMENTS

| | | | | |
|---|---|---|---|---|
| 2011/0131464 | A1* | 6/2011 | Ko | H04L 1/0041 714/752 |
| 2012/0307159 | A1* | 12/2012 | Ouchi | H04L 5/0007 348/723 |
| 2012/0307842 | A1 | 12/2012 | Petrov et al. | |
| 2012/0314762 | A1* | 12/2012 | Herrmann | H04N 21/2362 375/240.02 |
| 2013/0265957 | A1* | 10/2013 | Mourad | H04W 72/04 370/329 |
| 2014/0298397 | A1* | 10/2014 | Pichot | H04N 21/2221 725/116 |

OTHER PUBLICATIONS

ETSI TS 102 606 25. V1.1.1 (Oct. 2007), Digital Video Broadcasting (DVB); Generic Stream Encapsulation (GSE) Protocol, pp. 1-25.*

International Search Report dated Feb. 24, 2015 in PCT/JP2014/080868 (with English translation).

"Digital Video Broadcasting (DVB); Frame structure channel coding and modulation for a second generation digital terrestrial television broadcasting system (DVB-T2)" ETSI EN 302 755 v1.3.1, Apr. 2012, pp. 1-188.

Extended European Search Report issued in European Application No. 14867020.1 dated Aug. 7, 2017.

Digital Video Broadcasting, "Frame Structure Channel Coding and Modulation for Second Generation Digital Transmission System for Cable Systems (DVB-C2)," Final Draft ETSI EN 302 769, V1. 1.2, Geneva, Switzerland, Jun. 2010.

Digital Video Broadcasting, "TM4941 Draft S2-X Specification," Geneva, Switzerland, Oct. 2013.

Digital Video Broadcasting, "Second Generation Framing Structure, Channel Coding and Modulation Systems for Broadcasting, Interactive Services, News Gathering and other broadband satellite applications" Part II: S2-Extensions, Mar. 2014.

Digital Video Broadcasting, "Progress Report of Ad-Hoc Group S2 to TM-95," Geneva, Oct. 23-24, 2017.

* cited by examiner

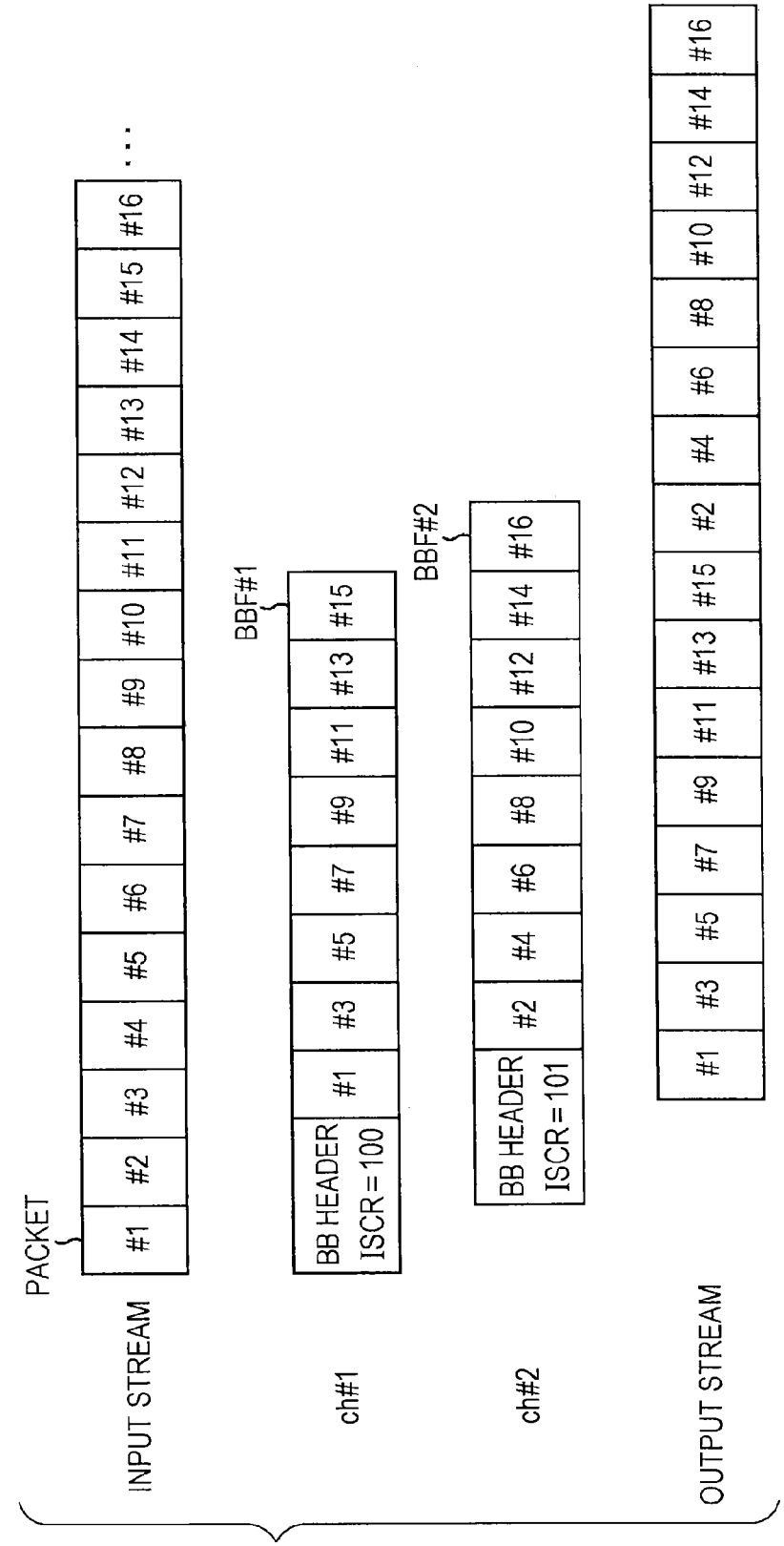

FIG. 11

ISSY FIELD CODING (2 OR 3 BYTES)

| FIRST BYTE | | | | SECOND BYTE | THIRD BYTE | |
|---|---|---|---|---|---|---|
| bit-7 (MSB) | bit-6 | bit-5 and bit-4 | bit-3 and bit-2 | bit-1 and bit-0 | bit-7 to bit-0 | bit-7 bit-0 |
| 0 = $ISCR_{short}$ | MSB of $ISCR_{short}$ | next 6 bits of $ISCR_{short}$ | | | next 8 bits of $ISCR_{short}$ | not present | ISCR (POINT-IN-TIME INFORMATION) |
| 1 | 0 = $ISCR_{long}$ | 6 MSBs of $ISCR_{long}$ | | | next 8 bits of $ISCR_{long}$ | next 8 bits of $ISCR_{long}$ |
| 1 | 1 | 00 = BUFS | BUFS unit 00 = bits 01 = Kbits 10 = Mbits 11 = reserved | 2 MSBs of BUFS | next 8 bits of BUFS | not present when $ISCR_{short}$ is used; else reserved | BUFS (PREDETERMINED Buffer AMOUNT) |
| 1 | 1 | 10 = BUFSTAT | BUFSTAT unit 00 = bits 01 = Kbits 10 = Mbits 11 = reserved | 2 MSBs of BUFSTAT | next 8 bits of BUFSTAT | not present when $ISCR_{short}$ is used; else reserved | BUFSTAT (READOUT START POINT-IN-TIME) |

FIG. 15A

| SYSTEM CONFIGURATIONS | | BROADCAST SERVICES | INTERACTIVE SERVICES | DSNG | PROFESSIONAL SERVICES | VL-SNR |
|---|---|---|---|---|---|---|
| FECFRAME (normal) (see MODCODs below) | 64 800 (bits) | | | | | |
| QPSK | 1/4, 1/3, 2/5 (S2-MODCODs) | N | N | N | N | N |
| | 1/2, 3/5, 2/3, 3/4, 4/5, 5/6, 8/9, 9/10 (S2-MODCODs) | N | N | N | N | N |
| | 13/45; | N | N | N | N | N |
| | 9/20; 11/20; | N | N | N | N | N |
| 8PSK | 3/5, 2/3, 3/4, 5/6, 8/9, 9/10 (S2-MODCODs) | N | N | N | N | N |
| | 23/36; 25/36; 13/18; | N | N | N | N | N |
| 8APSK-L (NOTE 7) | 5/9; 26/45; | N | N | N | N | N |
| 16APSK | 2/3, 3/4, 4/5, 5/6, 8/9, 9/10 (S2-MODCODs) | N | N | N | N | N |
| | 26/45; 3/5; 28/45; 23/36; 25/36; 13/18; 7/9; 77/90;; | N | N | N | N | N |
| 16APSK-L (NOTE 7) | 5/9; 8/15; 1/2; 3/5; 2/3 | N | N | N | N | N |
| 32APSK | 3/4, 4/5, 5/6, 8/9, 9/10 (S2-MODCODs) | N | N | N | N | N |
| | 32/45; 11/15; 7/8; | N | N | N | N | N |
| 32APSK-L (NOTE 7) | 2/3 | N | N | N | N | N |
| 64APSK | 11/15; 7/9; 4/5; 5/6; | O | N | N | N | O |
| 64APSK-L (NOTE 7) | 32/45 | O | N | N | N | O |
| 128APSK | 3/4; 7/9 | NA | O | O | N | NA |
| 256APSK | 32/45; 3/4 | NA | O | O | N | NA |
| 256APSK-L (NOTE 7) | 29/45; 2/3; 31/45; 11/15 | NA | O | O | N | NA |
| | | | | | | |
| FECFRAME (short) (see MODCODs below) | 16 200 (bits) | | | | | |
| QPSK | 1/4, 1/3, 2/5 (S2-MODCODs) | NA | N | O | N | N |
| | 1/2, 3/5, 2/3, 3/4, 4/5, 5/6, 8/9 (S2-MODCODs) | NA | N | O | N | N |
| | 11/45; 4/15; 14/45; 7/15; 8/15; 32/45 | NA | N | O | N | N |
| 8APSK | 3/5, 2/3, 3/4, 5/6, 8/9 (S2-MODCODs) | NA | N | O | N | N |
| | 7/15; 8/15; 26/45; 32/45 | NA | N | O | N | N |
| 16APSK | 2/3, 3/4, 4/5, 5/6, 8/9 (S2-MODCODs) | NA | N | O | N | N |
| 32APSK | 7/15; 8/15; 26/45; 3/5; 32/45 | NA | N | O | N | N |
| | 2/3; 32/45 | NA | N | O | N | N |

FIG. 15B

| | | | | | | |
|---|---|---|---|---|---|---|
| VL-SNR-Header (see MODCODs below) (NOTE 1) | | O | O | O | NA | N |
| QPSK | 2/9 (normal) | NA | O | O | NA | N |
| BPSK | 1/5; 4/15; 1/3 (short) 1/5; 11/45; 1/3 (medium) | NA | O | O | NA | N |
| BPSK-S Spreading Factor 2 | 1/5; 11/45 (short) | NA | O | O | NA | N |
| | | | | | | |
| Super-frame | | NA | O | O | O | O |
| Part II PLHEADER (NOTE 5) | 8-bits | N | N | N | N | N |
| Extended PLHEADER For Wide-band mode (NOTE 5) | 8+8 bits (time slicing) | O | O | NA | O | O |
| GSE-High Efficiency Mode | For GSE/GSE-Lite (NOTE 6) | N | N | N | N | N |
| Roll-off 1, 15; 1, 10 and 0, 05 | | N | N | N | N | N |
| Channel bonding (NOTE 2) | | N (NOTE 3) | NA | NA | O | NA |
| VCM (NOTE 4) | | N | N | N | N | N |
| ACM | | NA | N | O | O | N |
| N= normative, O = optional, NA= not applicable | | | | | | |
| NOTE 1: ABILITY TO SKIP VL-SNR FRAMES: NORMATIVE NOTE 2: REQUIRES INPUT STREAM SYNCHRONIZER, Null-PACKET DELETION AMD DUMMY FRAME INSERTION NOTE 3: NORMATIVE FOR BROADCAST SERVICES IN CASE OF OPTIONAL MULTIPLE TUNER RECEIVERS NOTE 4: ANY S2X RECEIVER SHALL BE ABLE TO RECOGNISE THE WHOLE SET OF MODCODS WITHIN THE PLHeader AND SKIP THE XFECFrame IF THE MODCOD IS NOT SUPPORTED NOTE 5: PART II PLHEADER AND EXTENDED PLHEADER FOR WIDEBAND TRANSPONDERS (PART I OR PART II, ANNEX M) CANNOT COEXIST IN THE SAME CARRIER BUT EITHER CAN COEXIST WITH THE VL-SNR HEADER NOTE 6: GSE IS OPTIONAL WHILE SUPPORT FOR GSE-Lite IN GSE-HEM IS NORMATIVE ACROSS ALL THE SERVICES. NOTE 7: xxx-L = MODCODs OPTIMISED FOR QUASI-LINEAR CHANNELS | | | | | | |

FIG. 16

TABLE 2 (SEE PART I, TABLE 3): MATYPE-1 FIELD MAPPING

| TS/GS | SIS/MIS | CCM/ACM | ISSYI | NPD/GSE-Lite | R0 | |
|---|---|---|---|---|---|---|
| | | | | | No Alternation with 11= high roll-off range | Alternation with 11= low roll-off range |
| 11 = Transport<br>00 = Generic Packetized<br>01 = Generic continuous<br>10 = GSE-HEM | 1 = single<br>0 = multiple | 1 = CCM<br>0 = ACM | 1 = active<br>0 = not-active | 1 = active<br>0 = not-active | 00 = 0,35<br>01 = 0,25<br>10 = 0,20 | 00 = 0,15<br>01 = 0,10<br>10 = 0,05 |

NOTE: GSE-Lite SIGNALS ARE DEFINED IN ANNEX D OF ETSI TS 102 606 [2].

FIGURE 1: STREAM FORMAT AT THE OUTPUT OF THE MODE ADAPTER, HIGH EFFICIENCY MODE FOR GSE (NO CRC-8 COMPUTED FOR UPs, OPTIONAL SINGLE ISSY INSERTED IN THE BBHEADER, UPL NOT TRANSMITTED)

FIGURE 3: EXAMPLE OF GSE CHANNEL BONDING AT THE RECEIVER

DATA PROCESSING DEVICE AND DATA PROCESSING METHOD

CROSS REFERENCE TO RELATED APPLICATIONS

This application claims the benefit of U.S. Provisional Application No. 61/911,807 filed Dec. 4, 2013, the entire contents of which are incorporated herein by reference.

BACKGROUND

The present technology relates to a data processing device and a data processing method. More particularly, the present technology relates to a data processing device and a data processing method capable of suitably processing streams, for example.

Examples of digital broadcasting formats include the Digital Video Broadcasting (DVB)-S2 employed in Europe, and so forth (see DVB-S.2: ETSI EN 302 307 V1.2.1 (2009-08)).

SUMMARY

One technique in digital broadcasting to transmit a stream with a high data rate is to split the stream with a high data rate into a stream of multiple channels at the transmitting side, transmit, and reconstruct the stream of multiple channels into the original stream with a high data rate at the receiving side. This technique is called CB (Channel Bonding).

However, even if the CB technique is employed in digital broadcasting such as DVB-S2 or the like, there is a concern that stream processing may not be able to be carried out suitably.

It has been found desirable to enable streams to be suitably processed.

A data processing device according to an embodiment includes a splitter configured to split an input stream made up of a plurality of packets, so as to generate split streams of a plurality of channels, of which the smallest increment is base band frames (BBFs) where the packets of the input stream are placed in consecutive order in a data field of the BBF which is the object of forward error correction (FEC).

A data processing method according to an embodiment includes splitting an input stream made up of a plurality of packets, so as to generate split streams of a plurality of channels, of which the smallest increment is BBFs where the packets of the input stream are placed in consecutive order in a data field of the BBF which is the object of FEC.

According to the above device and method, an input stream made up of a plurality of packets is split, so as to generate split streams of a plurality of channels, of which the smallest increment is BBFs where the packets of the input stream are placed in consecutive order in a data field of the BBF which is the object of FEC.

A data processing device according to an embodiment includes a reconstructing unit configured to reconstruct an input stream from split streams of a plurality of channels transmitted from a transmission device which splits the input stream made up of a plurality of packets, so as to generate the split streams of the plurality of channels, of which the smallest increment is BBFs where the packets of the input stream are placed in consecutive order in a data field of the BBF which is the object of FEC.

A data processing method according to an embodiment includes reconstructing an input stream from split streams of a plurality of channels transmitted from a transmission device which splits the input stream made up of a plurality of packets, so as to generate the split streams of the plurality of channels, of which the smallest increment is BBFs where the packets of the input stream are placed in consecutive order in a data field of the BBF which is the object of FEC.

According to the above device and method, an input stream is reconstructed from split streams of a plurality of channels transmitted from a transmission device which splits the input stream made up of a plurality of packets, so as to generate the split streams of the plurality of channels, of which the smallest increment is BBFs where the packets of the input stream are placed in consecutive order in a data field of the BBF which is the object of FEC.

The data processing device may be a standalone device, or may be an internal block making up an apparatus.

According to the present technology, streams can be suitably processed. The advantages described here are not restrictive, and other advantages in the present disclosure may be given.

BRIEF DESCRIPTION OF THE DRAWINGS

FIG. 10 is a diagram illustrating an example of split streams of channels ch#1 and ch#2, and an output stream;

FIG. 11 is a diagram illustrating the ISSY format stipulated in DVB-S2;

FIGS. 15A and 15B are diagrams illustrating Table 1 in the DVB-S2X standard;

FIG. 16 is a diagram illustrating Table 2 in the DVB-S2X standard;

DETAILED DESCRIPTION OF EMBODIMENTS

Embodiment of Transmission System to which Present Technology has been Applied

Figure 1:
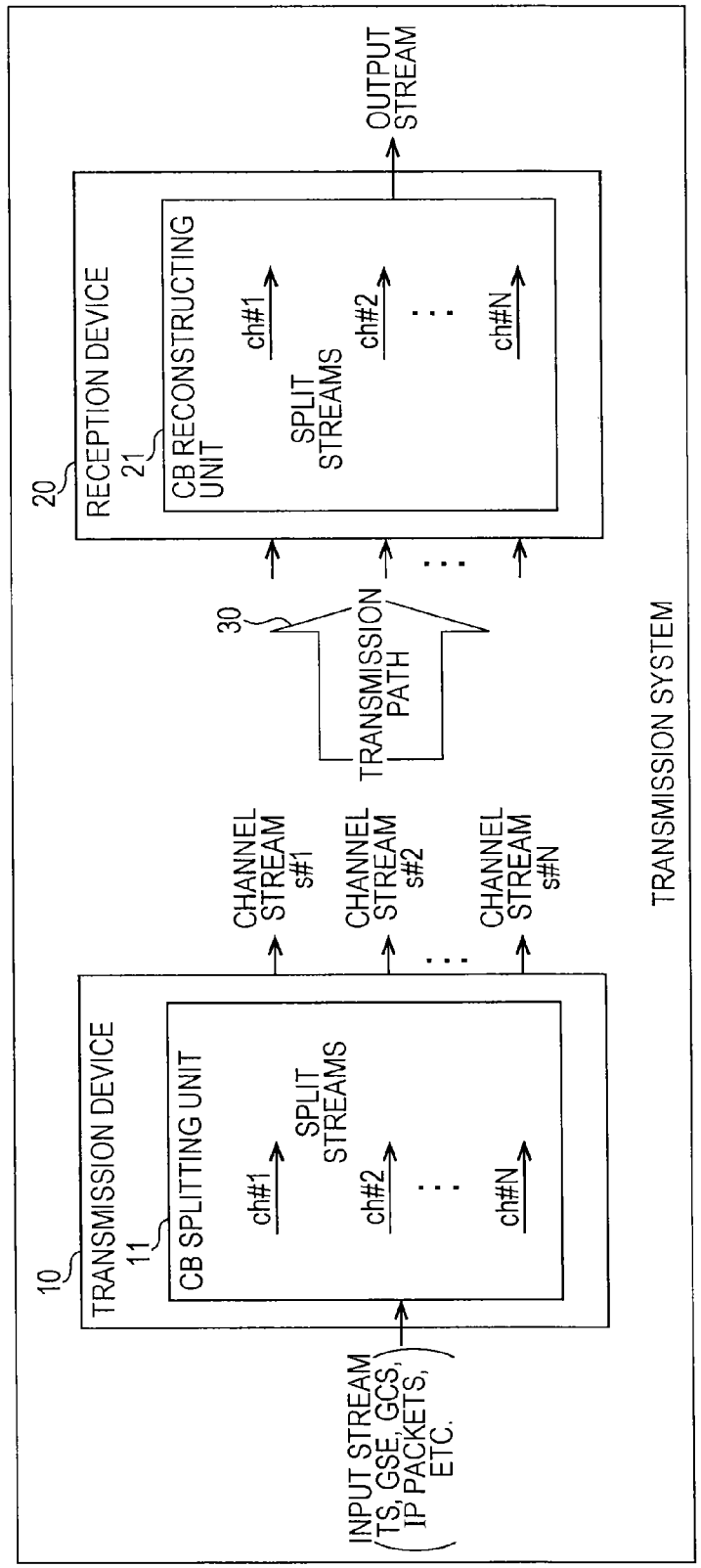
FIG. 1 is a block diagram illustrating a configuration example of an embodiment of a transmission system to which the present technology has been applied.

FIG. 1 is a block diagram illustrating a configuration example of an embodiment of a transmission system to which the present technology has been applied. In FIG. 1, the transmission system is made up of a transmission device 10 and a reception device 20.

The transmission device 10 performs transmission (data transmission) of television broadcasts, such as programs (digital broadcasting). That is to say, the transmission device 10 splits an input stream of object data which is the object of transmission, such as image data and audio data and the like serving as a program, for example, into a stream of multiple channels by the CB technique, and transmits via a transmission path 30 such as a satellite circuit, terrestrial waves, cable (cabled circuit) or the like, for example. The transmission device 10 includes a CB splitting unit 11, to which an input stream is supplied.

Note that the input stream may be, for example, a Transport Stream (TS), a Generic Continuous Stream (GCS), a stream of Generic Stream Encapsulation (GSE) packets, a stream of GSE-Lite packets, a stream of Internet Protocol (IP) packets, or any other stream made up of multiple packets (user packets (UP)).

The CB splitting unit 11 splits an input stream supplied thereto, and generates split streams of N channels (multiple channels) ch#1, ch#2, . . . , ch#N. The smallest increment of a channel is a base band frame (BBF) to be subjected to forward error correction (FEC), of which data field the packets are placed in, in their consecutive order in the input stream.

The CB splitting unit 11 subjects the split stream of the channels ch#n to FEC error correction encoding, modulation, and so forth, and transmits channel streams s#n of the channels ch#n obtained thereby over the transmission path 30. For example, in a case where the transmission system is a DVB-S2-compliant system, the transmission path 30 is a satellite circuit, and the channel streams s#n are transmitted over the transmission path 30 which is a satellite circuit.

The reception device 20 receives a stream of multiple channels transmitted from the transmission device 10 over the transmission path 30, and reconstructs and outputs the original input stream. The reception device 20 has a CB reconstructing unit 21, which receives the channel streams s#n for each channel ch#n from the transmission device 10.

Further, the CB reconstructing unit 21 subjects the channel streams s#n of the channels ch#n to processing such as demodulation, FEC error correction decoding, and so forth, reconstructs the original input stream from the split streams of the channels ch#n obtained thereby, and outputs this as an output stream.

Figure 2:
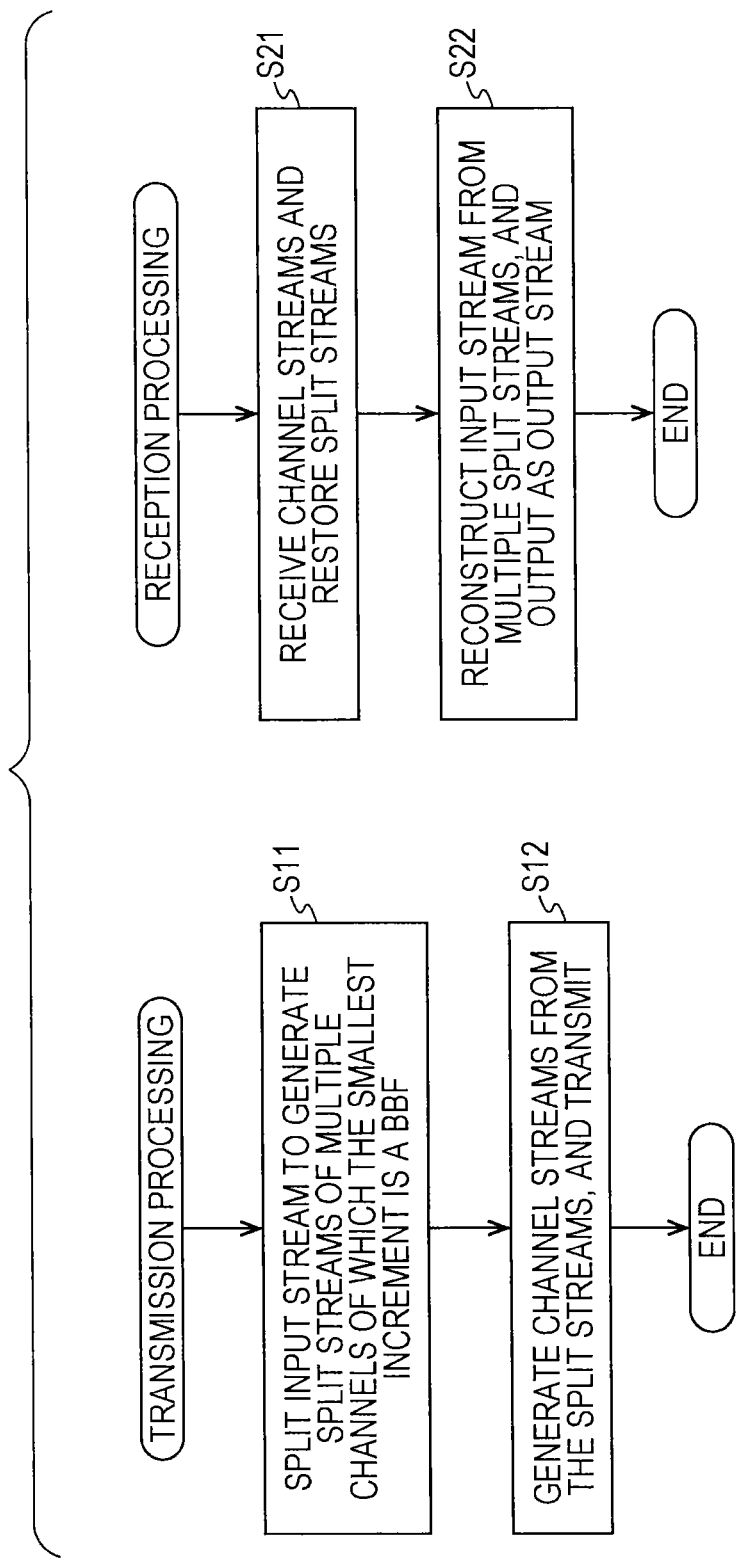
FIG. 2 is a flowchart for describing an example of processing by the transmission system.

FIG. 2 is a flowchart illustrating an example of processing performed at the transmission device 10 (transmission processing) and processing performed at the reception device 20 (reception processing) which are illustrated in FIG. 1.

On the side of transmission processing, in step S11 the CB splitting unit 11 of the transmission device 10 splits an input stream supplied thereto, and generates N channels ch#1 through ch#N. The smallest increment of the channels ch#1 through ch#N is BBFs, which have been arranged such that the packets of the input stream are in continuous order in the data field of the BBFs to be subjected to FEC. The flow then advances to step S12.

In step S12 the CB splitting unit 11 subjects the split streams of the channels ch#n to processing such as error correction encoding, modulation, and so forth, thereby generating channel streams s#n of the channels ch#n. The CB splitting unit 11 then transmits the channel streams s#n of the channels ch#n over the transmission path 30.

On the side of reception processing, in step S21 the CB reconstructing unit 21 of the reception device 20 receives the channel streams s#n of the channels ch#n from the transmission device 10. The CB reconstructing unit 21 then subjects the channel streams s#n of the channels ch#n to processing such as demodulation, error correction decoding, and so forth, thereby restoring the split streams of the channels ch#n, and the flow advances to step S22.

In step S22 the CB reconstructing unit 21 reconstructs the original input stream from the split streams of the channels ch#1 through ch#N, and outputs as an output stream.

First Configuration Example of CB Splitting Unit 11 of Transmission Device 10

Figure 3:
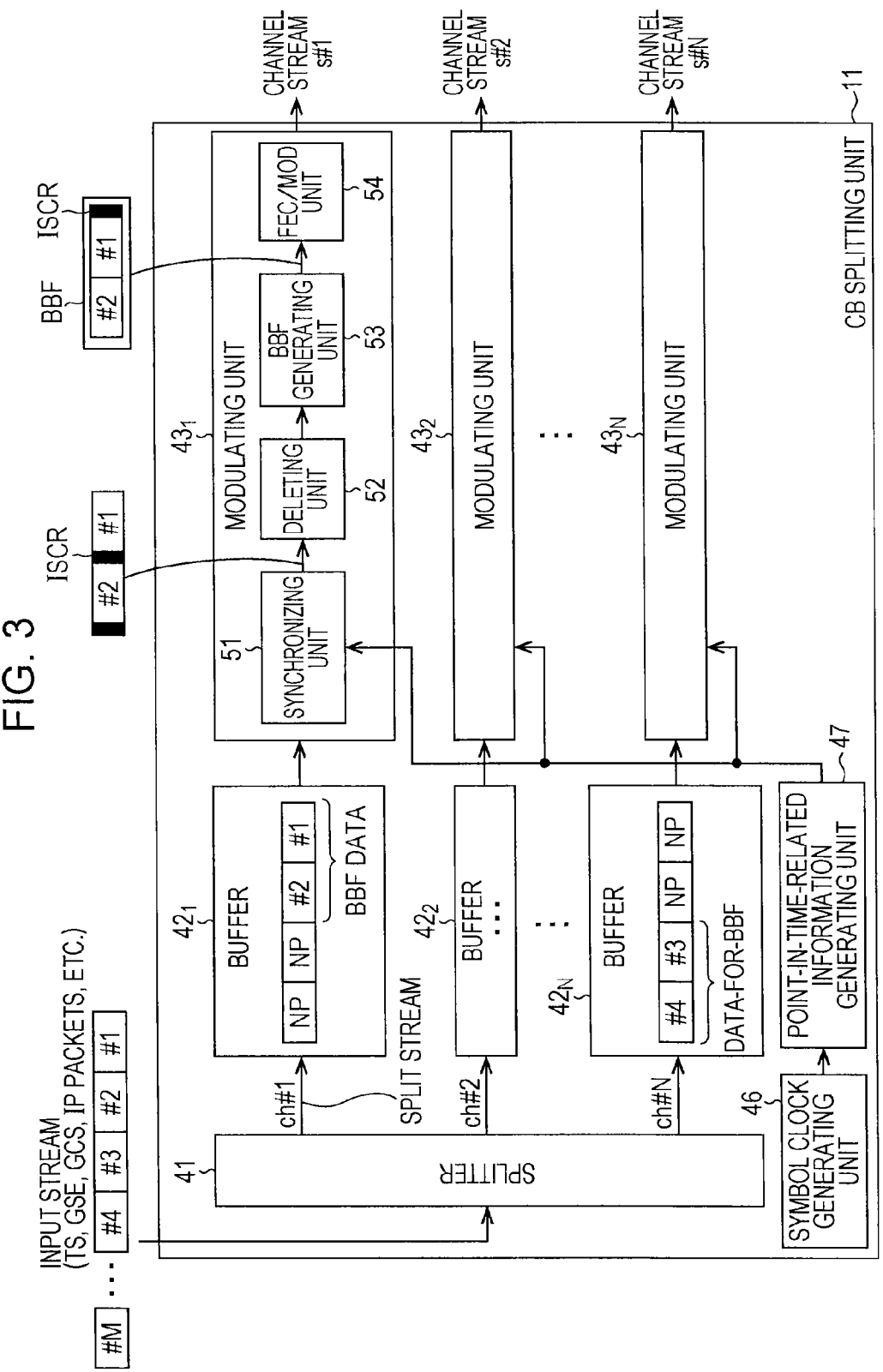
FIG. 3 is a block diagram illustrating a first configuration example of a CB splitting unit.

FIG. 3 is a block diagram illustrating a first configuration example of the CB splitting unit 11 of the transmission device 10 illustrated in FIG. 1. The CB splitting unit 11 in FIG. 3 includes a splitter 41, N buffers $42_1$ through $42_N$, N modulating units $43_1$ through $43_N$, a symbol clock generating unit 46, and a point-in-time-related information generating unit 47.

Input to the CB splitting unit 11 as an input stream is, for example, a high-data-rate (e.g., 100 Megabits per second (Mbps) or the like) TS made up of multiple TS packets #1, #2, and so on through #M, a high-data-rate stream made up of multiple GSE-Lite packets #1, #2, and so on through #M, or the like. The CB splitting unit 11 uses the CB technique to split the input stream into split streams of N (or less) channels, serving as the multiple channels, which are then transmitted.

The input stream is supplied to the splitter 41. The splitter 41 receives the input stream supplied thereto, and splits the input stream into N (or less) split streams of channels ch#1 through ch#N.

A BBF, which will be described later, is a fixed-length increment to be subjected to FEC, and has a Base Band (BB) header and a data field. In the following description, data of a data quantity of a data-for-BBF field, i.e., data placed in a data field of a BBF, will be referred to as "data-for-BBF". The splitter 41 extracts (selects) data of consecutive packets of an amount equivalent to the data quantity of data-for-BBF, from the packets of the input stream, as the data-for-BBF. The splitter 41 then distributes the data of these packets to a certain one channel ch#n out of the N channels ch#1 through ch#N.

The splitter 41 further extracts data of consecutive packets of an amount equivalent to the data quantity of data-for-BBF, from the subsequent packets of the input stream, as data-for-BBF, and distributes the data of these packets to the same channel ch#n as before or a different ch#n', out of the N channels ch#1 through ch#N. The splitter 41 repeats distributing of the input stream in increments of data-for-BBF, thereby generating the split streams of the N channels ch#1 through ch#N, of which data-for-BBF is the smallest increment, out of the input stream. The splitter 41 then supplies the packets of the split stream of channel ch#n (n'th channel) to the buffer $42_n$.

Now, by the input stream being split into split streams of N channels ch#1 through ch#N at the splitter 41, the split streams of each of the channels ch#n are streams which have a lower data rate than the data rate of the input stream. Accordingly, a split stream of one channel can be transmitted over a narrower transmission band as compared to a case of transmitting the input stream over one channel.

In a case where the input stream is a TS, the splitter 41 distributes the data-for-BBF to one channel of the N channels ch#1 through ch#N, and distributes null packets (NPs) of the same data quantity as the data-for-BBF in all other channels. Accordingly, in a case where the input stream is a TS, the portions in between the data-for-BBF of the split streams of the channels ch#n are filled with NPs.

Also, splitting the input stream into the split streams of channels ch#1 through ch#N by the splitter 41 is advantageous in that the intervals between one data-for-BBF and another in a split stream of channel ch#n are shorter and maximally uniform, for example. Moreover, splitting of the input streams is performed such that split streams are obtained of a data rate (or less) which can be transmitted over channel ch#n.

Buffer 42$_n$ is a first-in first-out (FIFO) buffer for example, which sequentially stores packets of split streams of channels ch#n supplied from the splitter 41, and further sequentially supplies the stored split streams of channels ch#n to the modulating unit 43$_n$.

The modulating unit 43$_n$ processes a split stream of channel ch#n from the buffer 42$_n$, and transmits a channel stream s#1 of channel ch#n obtained thereby. The modulating unit 43$_n$ includes a synchronizing unit 51, a deleting unit 52, a BBF generating unit 53, and a (forward error correction/modulation (FEC/MOD) unit 54.

The synchronizing unit 51 is supplied with a split stream of channel ch#n from the buffer 42$_n$, and also is supplied with an Input Stream Time Reference (ISCR), for example, from the point-in-time related information generating unit 47. An ISCR is a type of Input Stream Synchronizer (ISSY) stipulated in DVB-S2 and so forth, serving as point-in-time related information relating to packet transmission point-in-time and so forth.

The synchronizing unit 51 adds an ISCR to the end of each packet of the split stream of channel ch#n from the buffer 42$_n$, supplied from the point-in-time related information generating unit 47 when each packet was supplied to the synchronizing unit 51, and supplies the split stream of channel ch#n obtained thereby to the deleting unit 52.

The deleting unit 52 deletes the NPs, which had been inserted at the time of splitting of the input stream at the splitter 41, from the split stream of channel ch#n from the synchronizing unit 51, or more accurately, the split stream regarding which the ISCRs have been added to the packets of the split stream of channel ch#n. The deleting unit 52 then supplies the resulting split stream of channel ch#n to the BBF generating unit 53.

Now, in a case where the input stream is a stream other than a TS, the deleting unit 52 supplies the split stream from the synchronizing unit 51 to the BBF generating unit 53 without any change. Accordingly, if the input stream is not a TS, the deleting unit 52 does not have to be provided.

The BBF generating unit 53 generates BBFs, in which data field each data-for-BBF of the split stream of channel ch#n supplied from the deleting unit 52 is placed. The BBF generating unit 53 then supplies the split stream of channel ch#n made up of these BBFs to the FEC/MOD unit 54.

That is to say, the BBF generating unit 53 generates a BB header (a header of a BBF) including the ISCR added to the leading packet (the packet temporally first in order of the packets making up the data-for-BBF), which is a packet out of the packets making up the data-for-BBF of the split stream of channel ch#n supplied from the deleting unit 52.

The BBF generating unit 53 further deletes the ISCRs added to the packets making up the data-for-BBF, and adds BB headers to the data-for-BBF after deletion of the ISCRs, thereby generating BBFs in which data-for-BBF after ISCR deletion is placed in the data fields. The BBF generating unit 53 then supplies the split stream of channel ch#n made up of such BBFs, i.e., the split stream of channel ch#n of which BBFs are the smallest increment, to the FEC/MOD unit 54.

Now, the data-for-BBF obtained at the splitter 41 is data of continuous packets extracted from the input stream, and accordingly one or more packets of the input stream are placed as data-for-BBF in the BBF data field obtained at the BBF generating unit 53, in the consecutive order thereof.

Note that the ISCRs added to each of the packets of the split stream at the synchronizing unit 51 are deleted by the BBF generating unit 53, as described above, and only the ISCR added to the leading packet of the data-for-BBF is included in the BB header. Accordingly, an arrangement may be made where the synchronizing unit 51 does not add ISCRs but each of the packets in the split stream, but rather adds an ISCR to only the leading packet of the data-for-BBF in the split stream.

Also, the modulating unit 43$_n$ may be configured without a synchronizing unit 51. In this arrangement where the modulating unit 43$_n$ is configured without a synchronizing unit 51, the BBF generating unit 53 receives ISCRs supplied from the point-in-time related information generating unit 47, and of these ISCRs, the ISCR received at the timing of the leading packet of the data-for-BBF is included in the BB header of the BBF of which data field that data-for-BBF is placed.

Further, description has been made with regard to the above arrangement where the BBF generating unit 53 deletes the ISCRs added to the packets making up the data-for-BBF supplied from the deleting unit 52, and BBFs are generated by placing the data-for-BBF following deletion of ISCRs in the data field. However, an alternative arrangement may be made where the BBF generating unit 53 generates BBFs with the data-for-BBF from the deleting unit 52 placed in the data field without any change. In this case, the ISCR added to the leading packet of the data-for-BBF may or may not be included in the BB header.

The FEC/MOD unit 54 performs FEC, which is error correction encoding by BCH code, low-density parity-check (LDPC) code, or the like, on the BBF of the split stream of channel ch#n supplied from the BBF generating unit 53, which is to be subjected to FEC. The FEC/MOD unit 54 also generates a split stream of channel ch#n made up of DVB-S2 physical layer (PL) frames, by adding DVB-S2 PL headers (including extended PL headers), for example, to BBFs (FEC frames) after error correction encoding.

The FEC/MOD unit 54 further converts the split stream of channel ch#n mad up of the PL frames into symbols every certain number of bits, and performs orthogonal modulation of the symbols. The FEC/MOD unit 54 moreover transmits the transmission band (frequency band) modulation signals of the channel ch#n obtained from the orthogonal modulation as a channel stream s#n of the channel ch#n.

The symbol clock generating unit 46 generates a symbol clock, which is a clock for the symbol rate of one main channel of the channels ch#1 through ch#N (e.g., ch#1 or the like), and supplies this to the point-in-time related information generating unit 47.

The point-in-time related information generating unit 47 is made up of a counter, for example. The point-in-time related information generating unit 47 counts synchronously with the symbol clock from the symbol clock generating unit 46, thereby generating ISSYs such as ISCR or the like as point-in-time information, which are supplied to the modulating units $43_1$ through $43_N$, or more accurately, to the synchronizing units 51 thereof. Accordingly, the same ISSY, such as the same ISCR or the like, is supplied to all of the modulating units $43_1$ through $43_N$ at each point-in-time.

Transmission Processing of First Configuration Example of CB Splitting Unit 11

Figure 4:
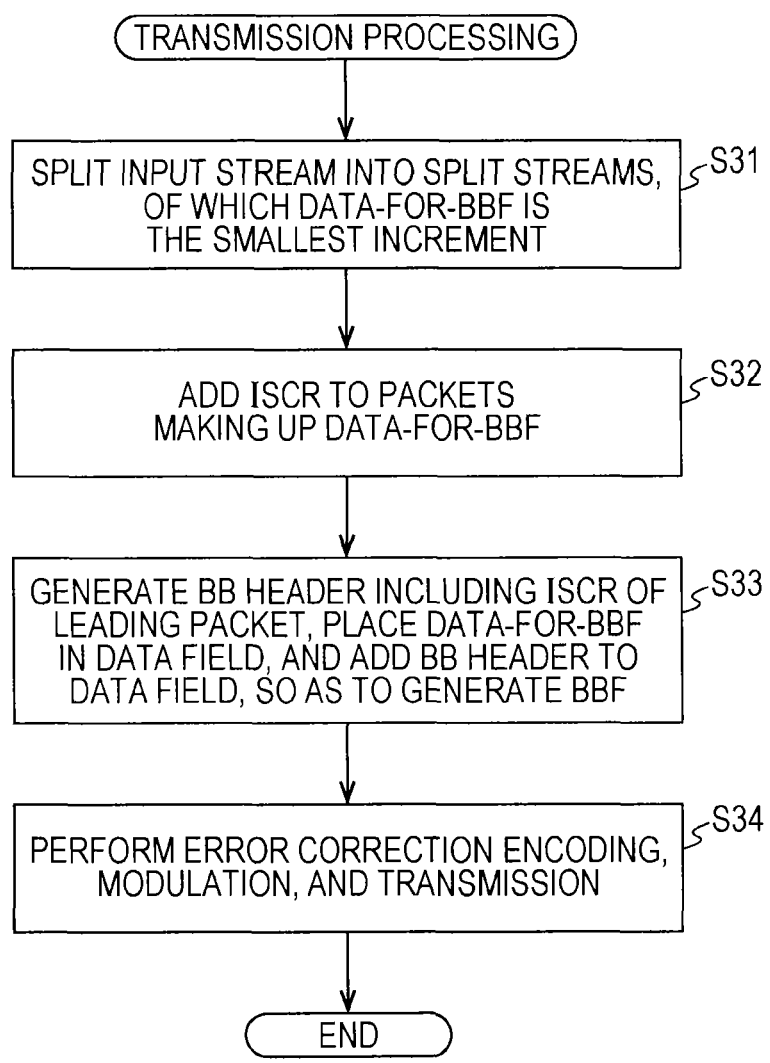
FIG. 4 is a flowchart for describing an example of processing (transmission processing) by the CB splitting unit.

FIG. 4 is a flowchart for describing processing performed by the CB splitting unit 11 illustrated in FIG. 3 (transmission processing).

In step S31, the splitter 41 splits an input stream supplied thereto, thereby generating split streams of N channels ch#1 through ch#N, of which data-for-BBF is the smallest increment, and supplies a split stream of channel ch#n to the buffer $42_n$. The buffer $42_n$ sequentially stores the split stream of channel ch#n supplied from the splitter 41, and further sequentially supplies the stored split stream of channel ch#n to the modulating unit $43_n$. The flow then advances from step S31 to step S32.

In step S32, the synchronizing unit 51 of the modulating unit $43_n$ adds the ISCR supplied from the point-in-time related information generating unit 47 to the end of each packet in the split stream of channel ch#n from the buffer $42_n$, and supplies the split stream of channel ch#n obtained thereby to the deleting unit 52.

In a case where the input stream is a TS, the deleting unit 52 deletes the NPs included in the split stream of channel ch#n from the synchronizing unit 51 (the split stream to which ISCRs have been added to each of the packets), and supplies the split stream of channel ch#n obtained thereby to the BBF generating unit 53. The flow then advances from step S32 to step S33.

In step S33, the BBF generating unit 53 generates a BB header including the ISCR added to the leading packet of the data-for-BBF in the split stream of channel ch#n supplied from the deleting unit 52. The BBF generating unit 53 further deletes the ISCRs added to the packets making up the data-for-BBF, and places the data-for-BBF following deletion of ISCRs into the BBF data field. The BBF generating unit 53 moreover generates a BBF by adding a BB header to the data field where the data-for-BBF has been placed, and supplies the split stream of channel ch#n, of which this BBF is the smallest increment, to the FEC/MOD unit 54. The flow then advances from step S33 to step S34.

In step S34, the FEC/MOD unit 54 performs error correction encoding by BCH code, LDPC code, or the like, on each BBF of the split stream of channel ch#n supplied from the BBF generating unit 53. The FEC/MOD unit 54 further configures PL frames including the BBFs after error correction encoding, and performs orthogonal modulation on the PL frames. The FEC/MOD unit 54 moreover transmits modulation signals of the split stream of channel ch#n obtained from the orthogonal modulation as a channel stream s#n of the channel ch#n.

Note that the steps S31 through S34 of the transmission processing illustrated in FIG. 4 are performed via pipeline. Thus, the CB splitting unit 11 splits the input stream into split streams of N channels ch#1 through ch#N of which the smallest increment is BBF, and transmits the split streams, so a high-data-rate input stream can be transmitted using multiple (N) channels of which the transmission band is not very wide. Moreover, the processing speed of the FEC/MOD unit 54 which performs error correction encoding and so forth on the BBFs obtained from the split stream of channel ch#n does not have to be very fast.

Second Configuration Example of CB Splitting Unit 11 of Transmission Device 10

Figure 5:
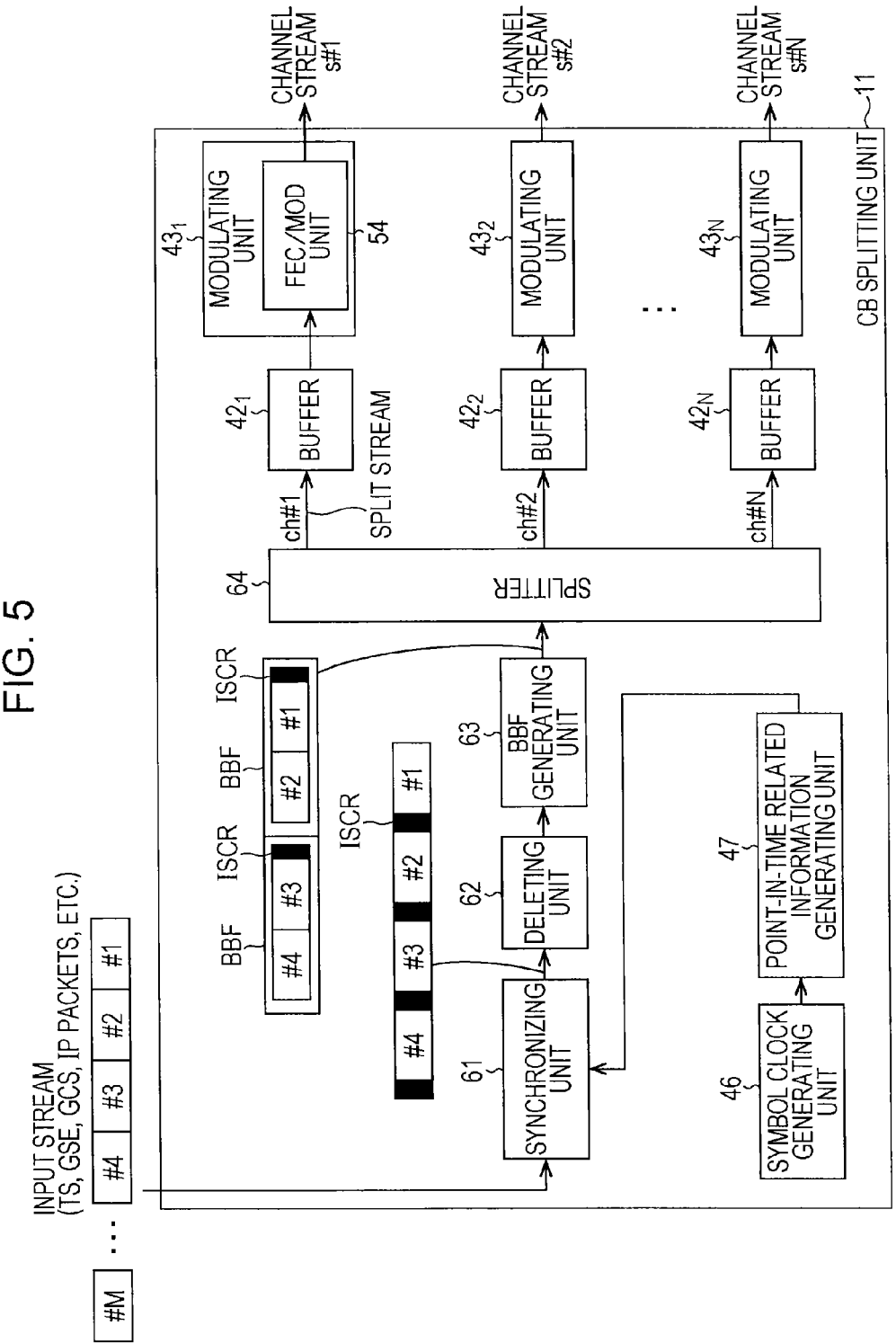
FIG. 5 is a block diagram illustrating a second configuration example of the CB splitting unit.

FIG. 5 is a block diagram illustrating a second configuration example of the CB splitting unit 11 of the transmission device 10 in FIG. 1. Note that portions in FIG. 5 which correspond to FIG. 3 are denoted by the same reference numerals, and description thereof will be omitted hereinafter as appropriate.

The CB splitting unit 11 in FIG. 5 has in common with the configuration in FIG. 3 the buffers $42_1$ through $42_N$, the modulating units $43_1$ through $43_N$, the symbol clock generating unit 46, and the point-in-time related information generating unit 47. On the other hand, the CB splitting unit 11 illustrated in FIG. 5 differs from that in FIG. 3 with regard to the point that it includes a splitter 64 instead of the splitter 41.

The CB splitting unit 11 in FIG. 5 also differs from the configuration in FIG. 3 regarding the modulating unit $43_n$. While the CB splitting unit 11 in FIG. 3 includes the synchronizing unit 51, deleting unit 52, BBF generating unit 53, and FEC/MOD unit 54, of these the CB splitting unit 11 in FIG. 5 only includes the FEC/MOD unit 54. Further, while the synchronizing unit 51, deleting unit 52, and BBF generating unit 53 of the CB splitting unit 11 in FIG. 3 are replaced by a synchronizing unit 61, a deleting unit 62, and a BBF generating unit 63 in FIG. 5, these components are not provided within the modulating unit $43_n$ as in FIG. 3 but rather each provided upstream of the splitter 64, which is another difference as to the arrangement in FIG. 3.

The CB splitting unit 11 in FIG. 5 is configured such that the input stream is supplied to the synchronizing unit 61. The synchronizing unit 61 adds, to the end of each packet of the input stream supplied thereto, an ISCR supplied from the point-in-time related information generating unit 47 when that packet is supplied to the synchronizing unit 61, and supplies the input stream obtained as a result thereof to the deleting unit 62.

In a case where the input stream from the synchronizing unit 61 (the input stream in which ISCRs have been added to the packets) is a TS, the deleting unit 62 deletes the NPs from the input stream which is a TS, and supplies the input stream obtained thereby to the BBF generating unit 63. In a case where the input stream from the synchronizing unit 61 is other than a TS, the deleting unit 62 supplies the split stream from the synchronizing unit 61 to the BBF generating unit 63 without any change. Accordingly, if the input stream is not a TS, the deleting unit 62 does not have to be provided.

The BBF generating unit 63 generates BBFs where packets of the input stream supplied from the deleting unit 62 are placed in the data field in consecutive order, and supplies an input stream configured of such BBFs to the splitter 64.

In more detail, the BBF generating unit 63 deletes the ISCRs added to the packets of the input stream supplied from the deleting unit 62, and sequentially extracts (selects) data of consecutive packets of an amount equivalent to the data quantity of data-for-BBF, from the input stream following deletion of the ISCRs, thereby splitting the input stream into increments of data-for-BBF.

The BBF generating unit 63 generates a BB header including the ISCR which had been added to the leading packet of the data-for-BBF. By further adding a BB header to the data-for-BBF, the BBF generating unit 63 generates BBFs where the data-for-BBF is placed in the data field. The BBF generating unit 63 then supplies an input stream configured of BBFs such as described above, i.e., input streams of which BBFs are the smallest increment, to the splitter 64.

Note that the data-for-BBF obtained by the BBF generating unit 63 is data of consecutive packets extracted from the input stream, so the data of packets of the input stream is placed in the data field of the BBFs obtained by the BBF generating unit 63 as data-for-BBF, in the consecutive order thereof.

Note that an arrangement may be made in the same way as with the case in FIG. 3, where an ISCR is added to just the leading packet of the data-for-BBF of the input stream, instead of adding ISCRs to each of the packets in the input stream. The CB splitting unit 11 may also be configured so that the BBF generating unit 63 receives ISCRs supplied from the point-in-time related information generating unit 47, and the synchronizing unit 61 is omitted. In this case, of the ISCRs received from the point-in-time related information generating unit 47, the ISCR which the BBF generating unit 63 has received at the timing of the leading packet of the data-for-BBF is included in the BB header of the BBF regarding which that data-for-BBF is placed in the data field.

Further, description has been made with regard to the above arrangement where the BBF generating unit 63 deletes the ISCRs added to the packets making up the data-for-BBF supplied from the deleting unit 62, and BBFs are generated by placing the data-for-BBF following deletion of ISCRs in the data field. However, an alternative arrangement may be made where the BBF generating unit 63 generates BBFs with the data-for-BBF from the deleting unit 62 placed in the data field without any change. In this case, the ISCR added to the leading packet of the data-for-BBF may or may not be included in the BB header.

The splitter 64 receives from the BBF generating unit 63 the input stream of which BBF is the smallest increment, and splits the input stream into the split streams of N (or less) channels ch#1 through ch#N of which BBF is the smallest increment. That is to say, the splitter 64 extracts (selects) a BBF from the input stream, and then distributes the BBF to a certain one channel ch#n out of the N channels ch#1 through ch#N.

The splitter 64 further extracts a subsequent BBF of the input stream, distributes the subsequent BBF to the same channel ch#n as before or a different channel ch#n', out of the N channels ch#1 through ch#N. The splitter 64 repeats distributing of the input stream in increments of BBFs, thereby generating the split streams of the N channels ch#1 through ch#N, of which BBF is the smallest increment, out of the input stream. The splitter 64 then supplies the packets of the split stream of channel ch#n to the buffer $42_n$.

The split stream of channel ch#n from the splitter 64 is temporarily stored at the buffer $42_n$, and supplied to the FEC/MOD unit 54 of the modulating unit $43_n$. The FEC/MOD unit 54 performs the same processing as that in the case of FIG. 3, on the BBFs of the split stream of channel ch#n from the buffer $42_n$.

That is to say, the FEC/MOD unit 54 performs FEC, which is error correction encoding by BCH code, LDPC code, or the like, on the BBF of the split stream of channel ch#n supplied from the buffer $42_n$. The FEC/MOD unit 54 also generates a split stream of channel ch#n made up of PL frames including BBFs following error correction encoding (FEC frames). The FEC/MOD unit 54 further performs orthogonal modulation of the split stream of channel ch#n made up of PL frames, and transmits modulation signals of the transmission band of the channel ch#n obtained from the orthogonal modulation, as a channel stream s#n of the channel ch#n.

In the same way as with the case in FIG. 3, by the input stream being split by the splitter 64 into split streams of N channels ch#1 through ch#N in the CB splitting unit 11 in FIG. 5, the split streams of each of the channels ch#n are streams which have a lower data rate than the data rate of the input stream. Accordingly, a split stream of one channel can be transmitted over a narrower transmission band as compared to a case of transmitting the input stream over one channel.

Also, splitting the input stream into the split streams of channels ch#1 through ch#N by the splitter 64 is advantageous in that the intervals between BBFs in a split stream of channel ch#n are shorter and maximally uniform, for example, in the same way as the case in FIG. 3. Moreover, splitting of the input streams is performed such that split streams are obtained of a data rate (or less) which can be transmitted over channel ch#n.

Transmission Processing of Second Configuration Example of CB Splitting Unit 11

Figure 6:
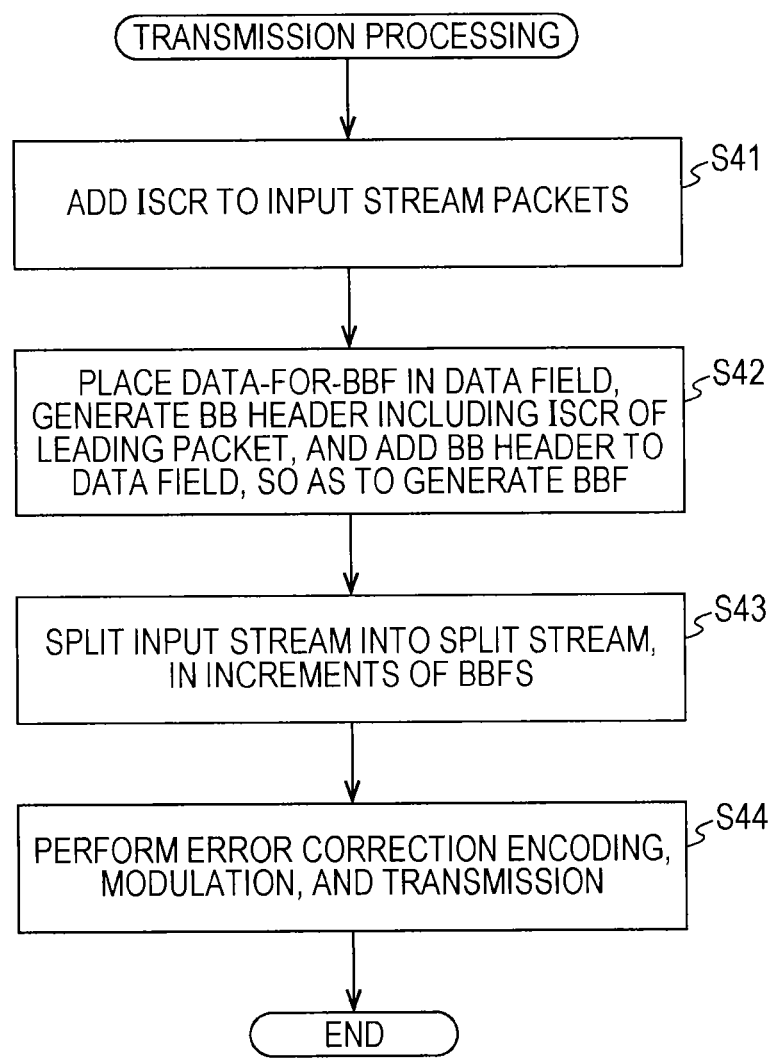
FIG. 6 is a flowchart for describing an example of processing (transmission processing) by the CB splitting unit.

FIG. 6 is a flowchart for describing processing performed by the CB splitting unit 11 illustrated in FIG. 5 (transmission processing).

In step S41, the synchronizing unit 61 adds the ISCR supplied from the point-in-time related information generating unit 47 to the end of each packet in the input stream supplied thereto, and supplies the input stream obtained thereby to the deleting unit 62.

The deleting unit 62 deletes the NPs included in the input stream from the synchronizing unit 61 as appropriate, and supplies the input stream obtained thereby to the BBF generating unit 63. The flow then advances from step S41 to step S42.

In step S42, the BBF generating unit 63 deletes the ISCRs added to the packets of the input stream supplied from the deleting unit 62, and extracts data of consecutive packets of an amount equivalent to the data quantity of data-for-BBF from the input stream following the ISCR deletion, thereby splitting the input stream into increments of data-for-BBF.

The BBF generating unit 63 generates a BB header including the ISCR which had been added to the leading packet of the data-for-BBF. By placing the data-for-BBF in the data field and adding a BB header to that data field, the BBF generating unit 63 generates BBFs where the data-for-BBF is placed in the data field. The BBF generating unit 63 then supplies an input stream of which BBFs are the smallest increment, generated as described above, to the splitter 64. The flow then advances from step S42 to step S43.

In step S43, the splitter 64 distributes the input stream from the BBF generating unit 63 into N channels ch#1 through ch#N, in increments of BBFs, thereby splitting the input stream into split streams of N channels ch#1 through ch#N of which BBF is the smallest increment. A split stream of channel ch#n is supplied from the splitter 64 to the modulating unit $43_n$ via the buffer $42_n$. The flow then advances from step S43 to step S44.

In step S44, the FEC/MOD unit 54 of the modulating unit $43_n$ performs error correction encoding by BCH code, LDPC code, or the like, on each BBF of the split stream of channel ch#n supplied via the buffer $42_n$. The FEC/MOD unit 54 further configures PL frames including the BBFs after error correction encoding, and performs orthogonal modulation on the PL frames. The FEC/MOD unit 54 moreover transmits modulation signals of the split stream of channel ch#n obtained from the orthogonal modulation, as a channel stream s#n of the channel ch#n.

Note that the steps S41 through S44 of the transmission processing illustrated in FIG. 6 are performed via pipeline. Thus, the CB splitting unit 11 in FIG. 5 splits the input stream into split streams of N channels ch#1 through ch#N, and transmits the split streams, in the same way as with the arrangement in FIG. 3, so a high-data-rate input stream can be transmitted using multiple channels of which the transmission band is not very wide. Moreover, the processing speed of the FEC/MOD unit 54 which performs error correction encoding and so forth on the BBFs obtained from the split stream of channel ch#n does not have to be very fast.

Configuration Example of CB Reconstructing Unit 21 of Reception Device 20

Figure 7:
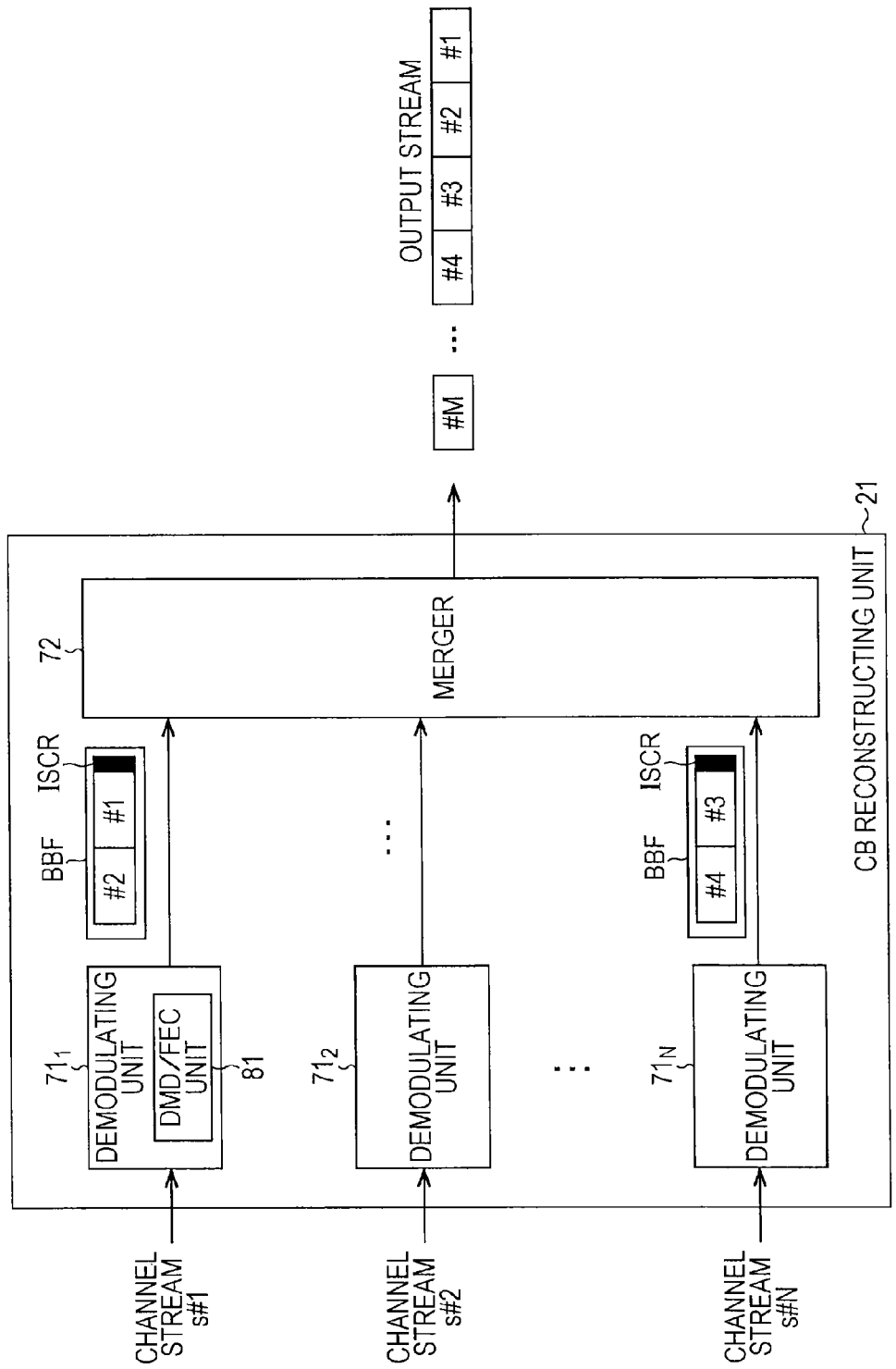
FIG. 7 is a block diagram illustrating a first configuration example of a CB reconstructing unit.

FIG. 7 is a block diagram illustrating a configuration example of the CB reconstructing unit 21 of the reception device 20 illustrated in FIG. 1. The CB reconstructing unit 21 in FIG. 7 includes N demodulating units $71_1$ through $71_N$, and a merger 72.

Each demodulating unit 71 receives and processes a channel stream s#n of a channel ch#n transmitted from the transmission device 10. More specifically, each demodulating unit 71 includes a demodulation(DMD)/FEC unit 81 which receives a channel stream s#n of a channel ch#n transmitted from the transmission device 10, and performs demodulation thereof which corresponds to the modulation that has been performed by the FEC/MOD unit 54 in FIG. 3 or 5. The DMD/FEC unit 81 then performs error correction decoding corresponding to the error correction encoding that has been performed by the FEC/MOD unit 54 in FIG. 3 or 5. Thus, the split stream of channel ch#n of which BBF is the smallest increment, supplied from the FEC/MOD unit 54 in FIG. 3 or 5, is restored and supplied to the merger 72.

The merger 72 disassembles the BBFs making up the split streams of channels ch#1 through ch#N supplied from the respective DMD/FEC units 81 of the demodulating units $71_1$ through $71_N$, and extracts the data-for-BBF placed in the data fields of the BBFs.

The merger 72 further arrays the data-for-BBF extracted from the BBFs in the order following the point-in-time indicated by the ISCRs included in the BB headers of the BBFs as point-in-time information (transmission point-in-time), thereby reconstructing the input stream made up of the multiple packets, which is then output as an output stream.

Reception Processing

Figure 8:
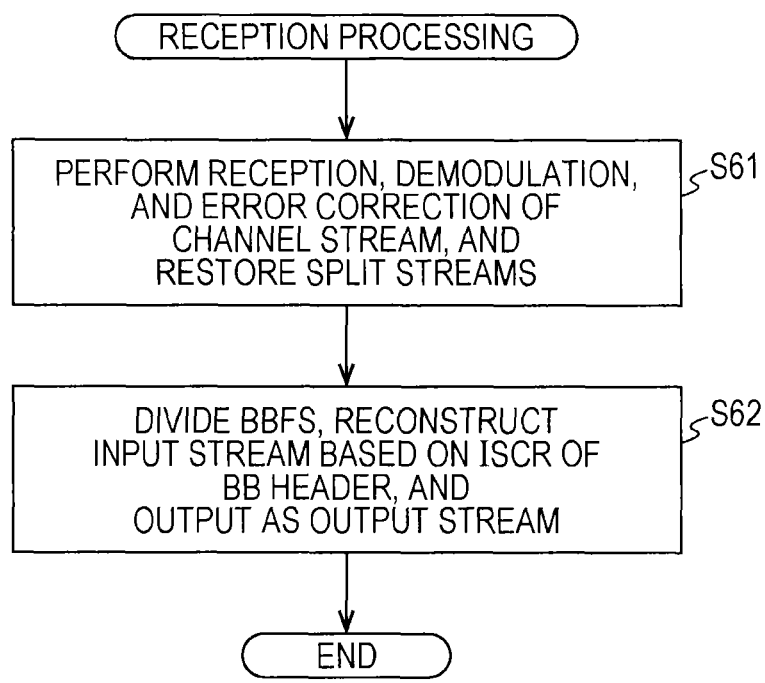
FIG. 8 is a flowchart for describing an example of processing (reception processing) by the CB reconstructing unit.

FIG. 8 is a flowchart for describing an example of processing by the CB reconstructing unit 21 in FIG. 7 (reception processing).

In step S61, the DMD/FEC unit 81 of each demodulating unit $71_n$ receives a channel stream s#n of channel ch#n transmitted from the transmission device 10, and performs demodulation and error correction decoding, thereby restoring a split stream of channel ch#n. The channel ch#n from each demodulating unit $71_n$ is supplied to the merger 72, and the flow advances to step S62.

In step S62, the merger 72 disassembles the BBFs making up the split streams of channels ch#1 through ch#N supplied from the respective DMD/FEC units 81 of the demodulating units $71_1$ through $71_N$, and extracts the data-for-BBF placed in the data fields of the BBFs. The merger 72 further arrays the data-for-BBF extracted from the BBFs in the order following the point-in-time indicated by the ISCRs included in the BB headers of the BBFs, thereby reconstructing the input stream, which is then output as an output stream, and the flow ends.

Note that the steps S61 and S62 of the reception processing illustrated in FIG. 8 are performed via pipeline. Thus, the merger 72 arrays the data-for-BBF extracted from the BBFs following the ISCRs included in the BB headers of the BBFs, so the original input stream can be restored from the split streams of channels ch#1 through ch#N.

That is, the CB splitting unit 11 of the transmission device 10 extracts data of consecutive packets of an amount equivalent to the data quantity of data-for-BBF from the input stream as data-for-BBF, and places the data-for-BBF in the data field of the BBFs, as described above. Thus, split streams of N channels ch#1 through ch#N, of which the smallest increment is BBFs placed in the data field in order of consecutive packets in the input stream, is generated, so packets of the input stream are placed in the data field of the BBFs in consecutive order.

Accordingly, packets of the input stream are placed in the data field of the BBFs in consecutive order, so the array of packets of the input stream can be restored by arraying packets of data-for-BBF in the data fields of BBFs making up the split streams of channels ch#1 through ch#N. This is performed following ISCRs included in the BB headers of the BBFs, and more particularly in the case of the present embodiment, following the ISCR added to the leading packet placed in the BBF data field.

Example of Split Stream and Output Stream

Figure 9:
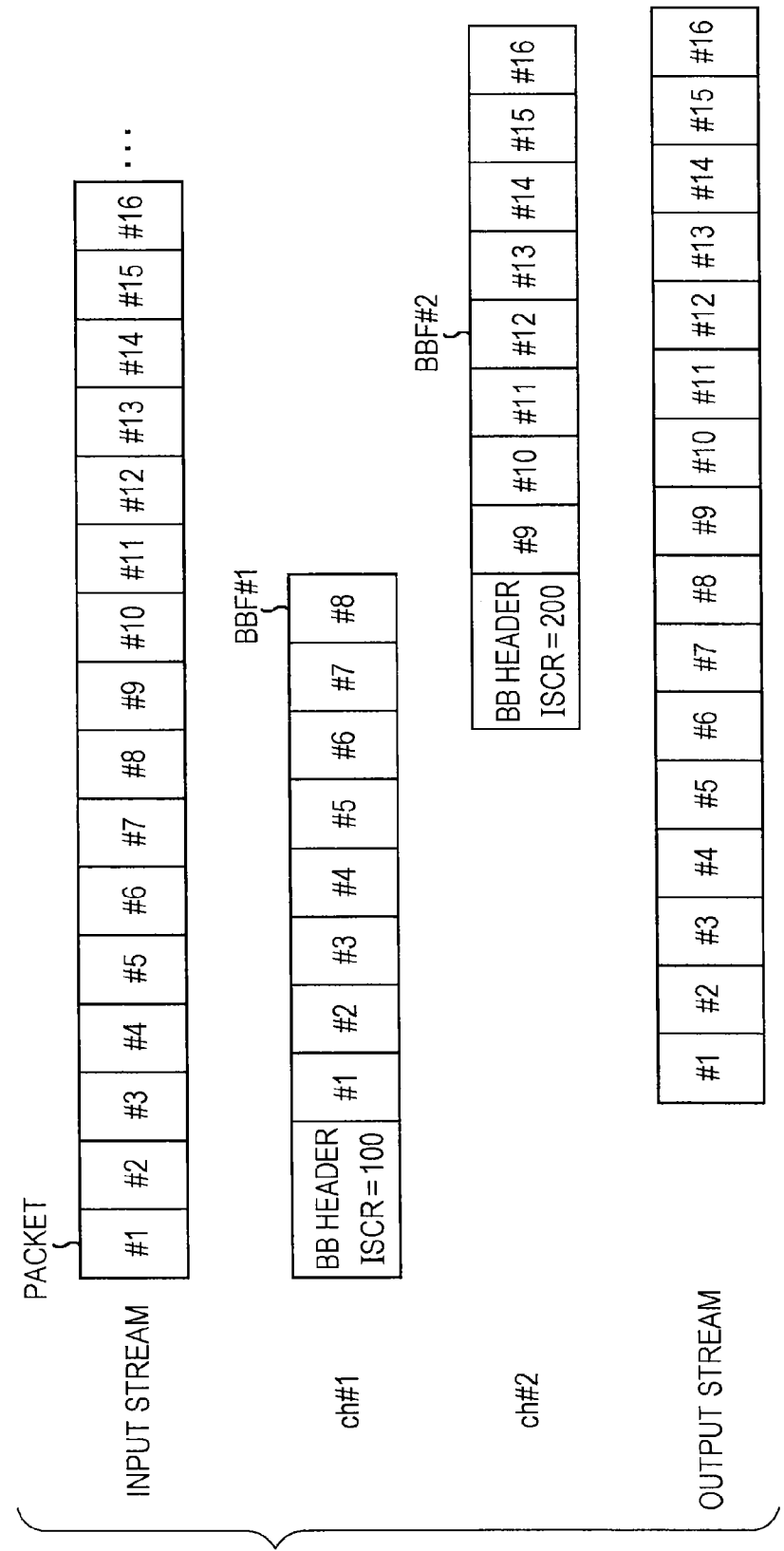
FIG. 9 is a diagram illustrating an example of split streams of channels ch#1 and ch#2, and an output stream.

FIG. 9 is a diagram illustrating an example of split streams of two channels ch#1 and ch#2 serving as N channels, and an output stream, in a case of extracting data of consecutive packets of an amount equivalent to data quantity of data-for-BBF from an input stream as data-for-BBF, and placing that data-for-BBF in the data field of BBFs. The input stream is also illustrated in FIG. 9, with packets #1, #2, and so on, arrayed in that order.

In the example illustrated in FIG. 9, eight consecutive packets for example, equivalent to the data quantity of the data-for-BBF, are extracted as data-for-BBF, such as packets #1 through #8, #9 through #16, or the like, for example. This data-for-BBF is extracted from the input stream, and placed in the data field, thereby making up a BBF. The input stream is thus split into a split stream of channel ch#1 and a split stream of channel ch#2 made up such BBFs. The BB headers of the BBFs making up the split streams include an ISCR added to the leading packet of the data-for-BBF placed in that BBF.

In FIG. 9, a BBF#1 in which consecutive packets #1 through #8 serving as data-for-BBF are placed in the data field is the BBF of the split stream of channel ch#1. A BBF#2 in which consecutive packets #9 through #16 serving as data-for-BBF are placed in the data field is the BBF of the split stream of channel ch#2.

The BB header of the BBF#1 includes "100", for example, which is an ISCR added to the leading packet #1 of the packets #1 through #8 serving as data-for-BBF placed in that BBF#1. In the same way, the BB header of the BBF#2 includes "200", for example, which is an ISCR added to the leading packet #9 of the packets #9 through #16 serving as data-for-BBF placed in that BBF#2.

FIG. 9 illustrates that by arraying the eight consecutive packets #1 through #8 serving as data-for-BBF, placed in the BBF#1 of the split stream of channel ch#1, and the eight consecutive packets #9 through #16 serving as data-for-BBF, placed in the BBF#2 of the split stream of channel ch#2, following the ISCRs included in the BB headers of the BBFs making up the split streams, enables the original input stream to be reconstructed as an output stream.

FIG. 10 is a diagram illustrating an example of split streams of two channels ch#1 and ch#2 serving as N channels, and an output stream, in a case of extracting non-consecutive packets of an amount equivalent to data quantity of data-for-BBF from an input stream as data-for-BBF, and placing that data-for-BBF in the data field of BBFs. The input stream is also illustrated in FIG. 10, with packets #1, #2, and so on, arrayed in that order, in the same way as with FIG. 9.

In the example illustrated in FIG. 10, eight non-consecutive packets, equivalent to the data quantity of the data-for-BBF, are extracted as data-for-BBF, such as eight every other packet from #1 such as #1, #3, and so on through #15, or such as eight every other packet from #2 such as #2, #4, and so on through #16, or the like, for example. This data-for-BBF is extracted from the input stream, and placed in the data field, thereby making up a BBF. The input stream is thus split into a split stream of channel ch#1 and a split stream of channel ch#2 made up such BBFs. The BB headers of the BBFs making up the split streams include an ISCR added to the leading packet of the data-for-BBF placed in that BBF.

In FIG. 10, a BBF#1 in which eight non-consecutive packets, i.e., every other packet from #1 such as #1, #3, and so on through #15, serving as data-for-BBF are placed in the data field is the BBF of the split stream of channel ch#1. A BBF#2 in which eight non-consecutive packets, i.e., every other packet from #2 such as #2, #4, and so on through #16, serving as data-for-BBF are placed in the data field is the BBF of the split stream of channel ch#2.

The BB header of the BBF#1 includes "100", for example, which is an ISCR added to the leading packet #1 of the packets #1, #3, and so on through #15 serving as data-for-BBF placed in that BBF#1. In the same way, the BB header of the BBF#2 includes "101", for example, which is an ISCR added to the leading packet #2 of the packets #2, #4, and so on through #16 serving as data-for-BBF placed in that BBF#2.

FIG. 10 illustrates that by arraying the eight non-consecutive packets #1, #3, and so on through #15 serving as data-for-BBF, placed in the BBF#1 of the split stream of channel ch#1, and the eight consecutive packets #2, #4, and so on through #16 serving as data-for-BBF, placed in the BBF#2 of the split stream of channel ch#2, following the ISCRs included in the BB headers of the BBFs making up the split streams, results in the packet array of packets #1, #3, . . . , #15, #2, #4, . . . , #16.

Accordingly, in a case of configuring BBFs using non-consecutive packets of an amount equivalent to data quantity of data-for-BBF, as data-for-BBF, the original input stream is not reconstructed as an output stream just by using the ISCRs included in the BB headers of the BBFs making up the split streams.

ISSY Format

FIG. 11 is a diagram illustrating the format of an ISSY as stipulated in DVB-S2. An ISSY includes ISCR, BUFS, and BUFSTAT. As described above, an ISCR is point-in-time information representing the transmission point-in-time of a packet, and is 2 or 3 byte information. Note that there are two types of ISCRs; long and short. A short ISCR is 2 bytes, and a long ISCR is 3 bytes.

BUFS is substantially 2-byte information representing buffer capacity for a buffer (omitted from illustration) storing a split stream from which NPs have been deleted at the deleting unit 52 of the CE splitting unit 11 illustrated in FIG. 3 (hereinafter also referred to as post-deletion stream), at the time of restoring split streams with the NPs inserted, by insertion of the NPs at the splitter 41 (hereinafter also referred to as NP-inserted stream).

Note that the two bits of the fifth bit and sixth bit from the head of the bit string which is the 2-byte (First Byte and Second Byte) BUFS is called BUFS_UNIT, representing the unit of buffer capacity which the BUFS represents. The ten bits from the seventh bit to the last 16th bit represent the buffer capacity value.

The reception device 20 secures storage region for the buffer of a buffer capacity indicated by BUFS, at the merger 72 of the CB reconstructing unit 21 (FIG. 7), and restores the post-deletion stream into the NP-inserted stream while writing the post-deletion stream to the buffer and reading out while inserting NPs.

BUFSTAT is substantially 2-byte information representing the start point-in-time for readout of packets from the buffer, when the merger 72 reads out the packets of the post-deletion stream stored in the buffer so as to restore the post-deletion stream as the NP-inserted stream.

Note that the two bits of the fifth bit and sixth bit from the head of the bit string which is the 2-byte (First Byte and Second Byte) BUFSTAT is called BUFSTAT_UNIT, representing the unit of readout start point-in-time which the BUFSTAT represents. The ten bits from the seventh bit to the last 16th bit represent the value of the readout start point-in-time. The ten bits of BUFSTAT represent the readout start point-in-time by the remaining data quantity in the buffer at the time of reading out packets from the buffer.

When restoring the post-deletion stream into the NP-inserted stream at the merger 72 for example, the reception device 20 starts packet readout from the buffer at a timing (point-in-time) which the BUFSTAT indicates.

BBF Format

Figure 12:
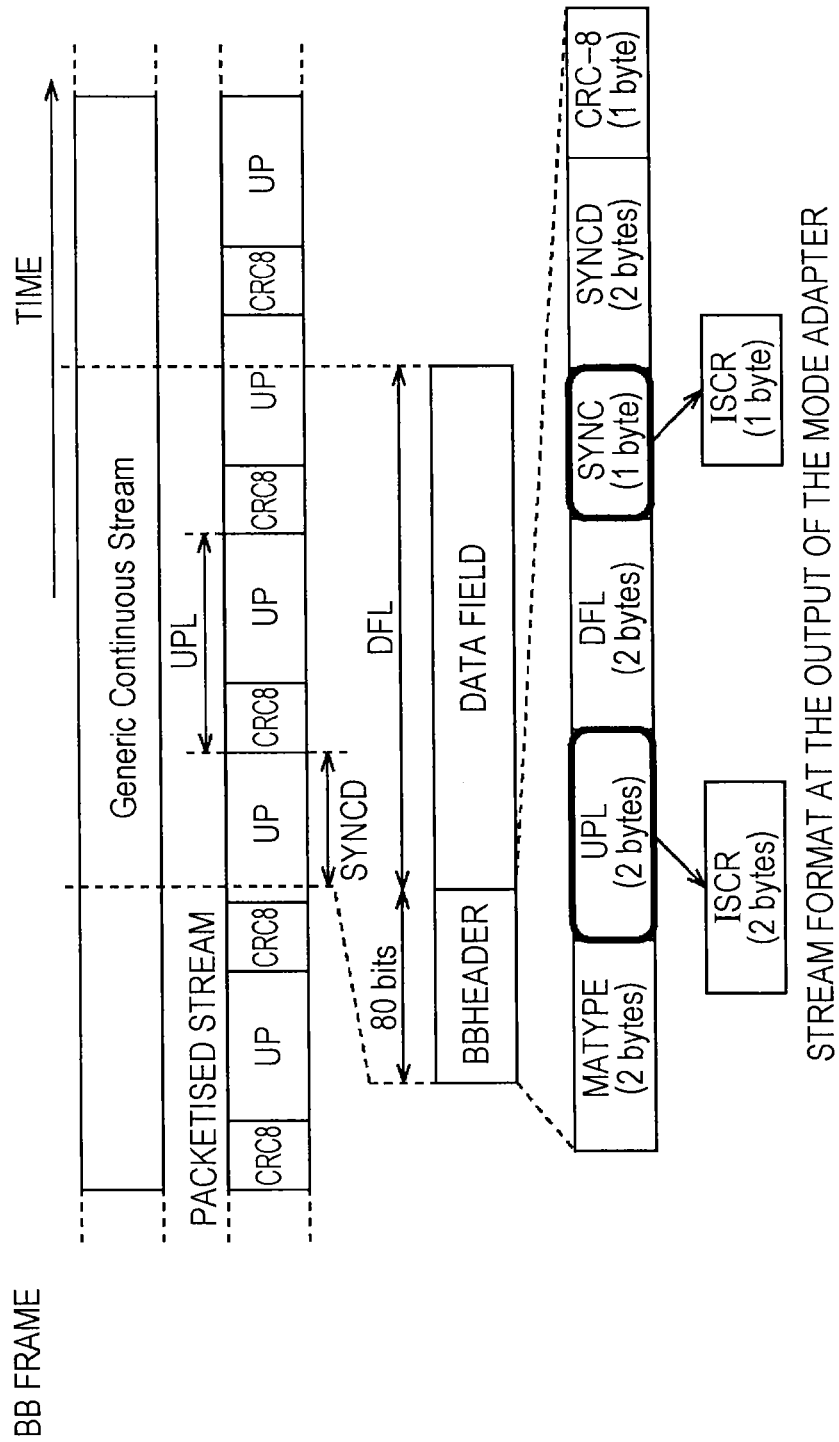
FIG. 12 is a diagram illustrating the BBF format stipulated in DVB-S2.

FIG. 12 is a diagram illustrating the BBF format according to DVB-S2. As described above, the CB splitting unit 11 (FIGS. 3 and 5) includes the ISCR of the leading packet of the data-for-BBF placed in the data field of the BBF, in the BB header of that BBF.

In a case of including an ISCR in a BB header, a field in the BB header regarding which a fixed value is set in DVB-S2, for example, can be used as the field to include the ISCR. Examples of fields in the BB header regarding which a fixed value is set include the 2-byte UPL field and 1-byte SYNC field.

If the ISCR is 3 bytes for example, the two bytes at the most significant bit (MSB) side of the three bytes of the ISCR can be included in the UPL field, and the one byte at the least significant bit (LSB) side can be included in the SYNC field.

Signaling in Case Input Stream is GSE Packet or GSE-Lite Packet Stream

Figure 13:
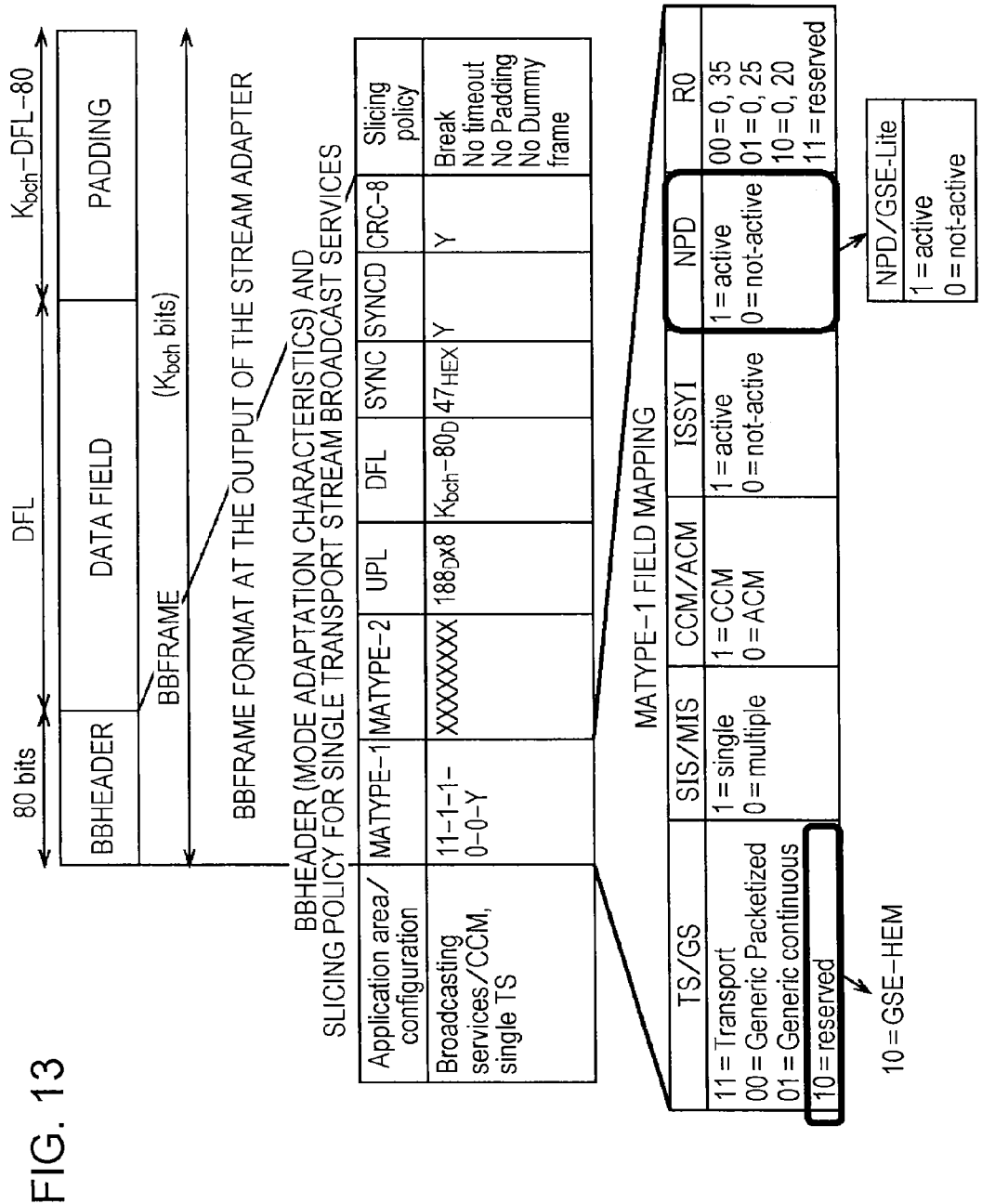
FIG. 13 is a diagram for describing an example of signaling to notify that an input stream is a GSE packet or GSE-Lite packet stream.

FIG. 13 is a diagram for describing, in a case where the input stream is a GSE packet or a GSE-Lite packet stream, an example of signaling to make notification to that effect. That is to say, FIG. 13 illustrates the format of a BB header of a BBF according to DVB-S2.

A BB header of a BBF according to DVB-S2 is 80-bit data, including a 1-byte MATYPE-1, a 1-byte MATYPE-2, a 2-byte UPL, a 2-byte DFL, a 1-byte SYNC, a 2-byte SYNCD, and a 1-byte CRC-8, in that order. Assigned to the 1-byte MATYPE-1 at the head of the BB header are a 2-bit TS/GS, a 1-bit SIS/MIS, a 1-bit CCM/ACM, a 1-bit ISSYI, a 1-bit NPD, and a 2-bit RO.

In DVB-S2 the input stream is a TS, and accordingly in a case where TS packets are included in a BBF (a case where TS packets are placed in the BBF data field), the TS/GS is set to 11b (where "b" indicates that the immediately-preceding numerical value is a binary value). Also, in a case where the input stream is a generic packetized stream, in DVB-S2 the TS/GS is set to 00b, and in a case where the input stream is a generic continuous stream, the TS/GS is set to 01b.

However, DVB-S2 has no stipulations regarding TS/GS settings in a case where the input stream is a GSE packet or GSE-Lite packet stream. Further, 10b is unused as a setting value for the 2-bit TS/GS. Moreover, if TS/GS is set to the unused value 10b, NPD will not function (NPD functions when the input stream is a TS and TS/GS is set to 11b) in DVB-S2.

Accordingly, by defining a mode where a GSE packet or GSE-Lite packet stream is transmitted as an input stream as a GSE-High-Efficiency Mode (HEM), GSE-HEM signaling which is signaling to notify GSE-HEM can be performed using the TS/GS and NPD in the MATYPE-1 in the BB header, for example.

That is to say, in a case where the input stream is a GSE packet or GSE-Lite packet stream, the TS/GS can be set to 10b which represents GSE-HEM, and the NPD can be set depending on which of GSE packets or GSE-Lite packets the input stream is, for example. Specifically, in a case where the input stream is a GSE packet stream, the NPD can be set to 0, and in a case where the input stream is a GSE-Lite packet stream, the NPD can be set to 1. According to this GSE-HEM signaling, the input stream can be identified as being a GSE-Lite packet stream in a case where TS/GS is set to 10b and NPD is set to 1, and can be identified as being a GSE packet stream in a case where TS/GS is set to 10b and NPD is set to 0.

The BBF generating unit 53 (FIGS. 3 and 5) can generate BB headers including such GSE-HEM signaling for the BBFs generated at the BBF generating unit 53. Transmitting BBFs having such BB headers enables the reception device 20 which receives the BBFs to easily identify that the data placed in the data field of the BBFs is GSE packets, GSE-Lite packets, and so forth, based on the GSE-HEM signaling included in the BB headers of the BBFs.

Moreover, the reception device 20 can identify that the data field of a BBF is GSE packets or GSE-Lite packets without implementing complicated rules and logic to analyze the data field of BBFs to that end.

Description of Computer to which Present Technology has been Applied

Next, the above-described series of processing such as input stream splitting and reconstructing can be carried out by hardware, or can be carried out by software. In a case where the series of processing is to be carried out by software, a program making up the software is installed into a general-purpose computer or the like.

Figure 14:
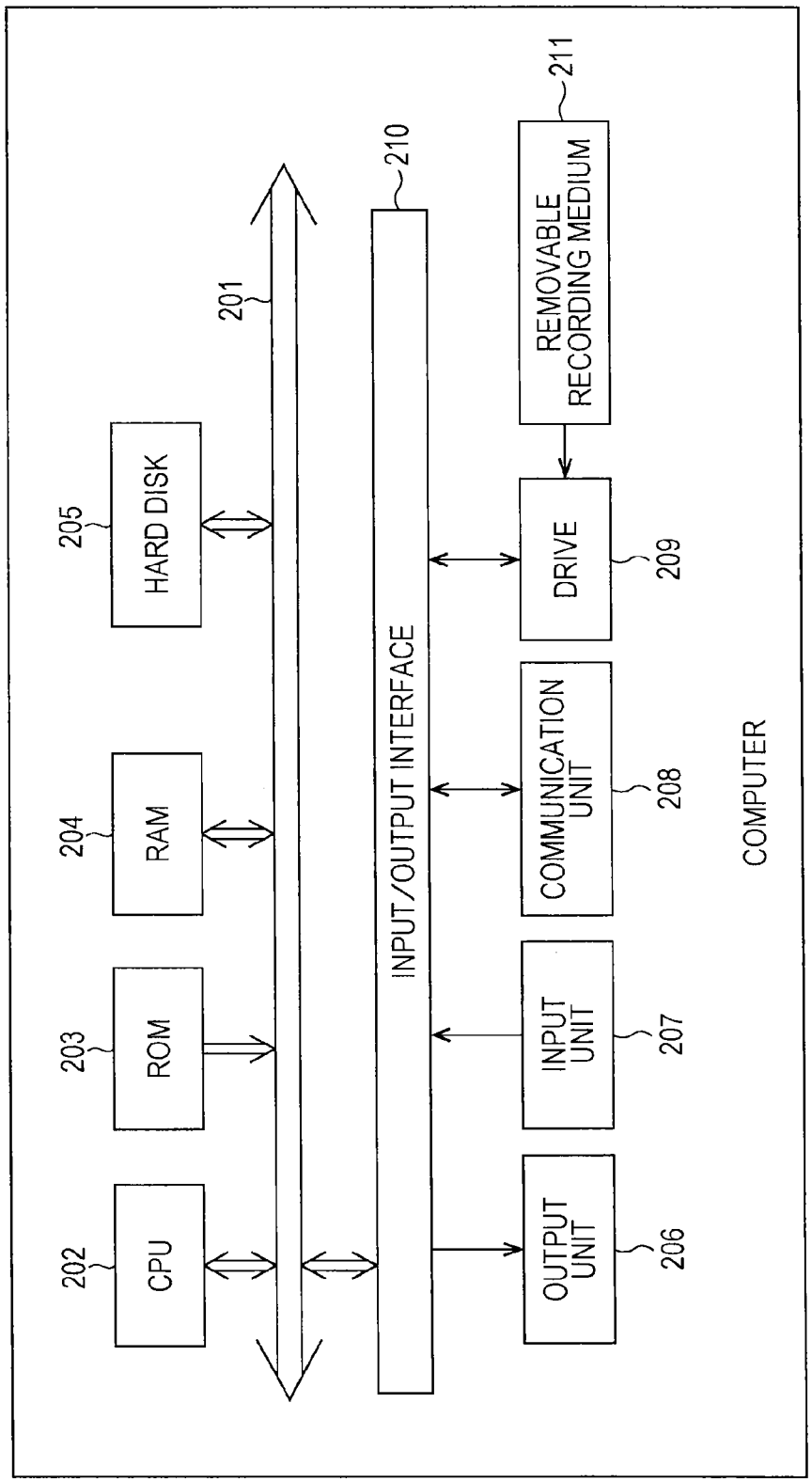
FIG. 14 is a block diagram illustrating a configuration example an embodiment of a computer to which the present technology has been applied.

FIG. 14 illustrates a configuration example of an embodiment of a computer to which a program which caries out the above-described series of processing is installed.

The program may be recorded beforehand in a hard disk 205 or ROM 203 serving as a recording medium built into the computer. Alternatively, the program may be stored (recorded) in a removable recording medium 211. Such a removable recording medium 211 can be provided as so-called packaged software. Examples of the removable recording medium 211 include flexible disks, Compact Disc Read Only Memory (CD-ROM), Magneto Optical (MO) disks, Digital Versatile Disc (DVD), magnetic disks, semiconductor memory, and so forth.

In addition to being installed to the computer from the removable recording medium 111 such as described above, the program may be downloaded to the computer via a communication network or broadcast network and installed in the built-in hard disk 205. That is to say, the program may be wirelessly transferred from a download site to the computer via a digital satellite broadcast satellite, or transferred to the computer by cable via a network such as a local area network (LAN), the Internet, or the like, for example.

The computer has a central processing unit (CPU) 202 built in, and the CPU 202 is connected to an input/output interface 210 by a bus 201. Upon a user operating an input unit 207 via the input/output interface 210 to input a command, the CPU 202 executes a program stored in read only memory (ROM) 203. Alternatively, the CPU 202 loads a program stored in the hard disk 205 to random access memory (RAM) 204 and executes the program.

Accordingly, the CPU 202 performs processing according to the above-described flowcharts, or processing carried out by the configuration of the above-described block diagrams. The CPU 202 then outputs the processing result thereof from an output unit 206, or transmits from a communication unit 208, or further records in the hard disk 205, or the like, via the input/output interface 210 as appropriate.

Note that the input unit 207 is made up of a keyboard, mouse, microphone and so forth. Also, the output unit 206 is configured including a liquid crystal display (LCD), speaker, and so forth.

Now, in the present Specification, the processing which the computer performs following the program is not restricted to being performed following the order described in the flowcharts in time sequence. That is to say, the processing which the computer performs following the program includes processing executed in parallel or individually (e.g., parallel processing or object-based processing).

Also, the program may be processed by an individual computer (processor), or may be processed in a distributed manner by multiple computers.

Further, in the present specification, the term "system" means a collection of multiple components (devices, modules (parts) and so forth), regardless of whether all components are within the same housing. Multiple devices in separate housings and connected via network, and a single device having multiple modules stored within a single housing, are both "systems".

Note that embodiments of the present technology are not restricted to the above-described embodiment, and that various modifications may be made without departing from the essence of the present technology.

For example, the present technology may assume a configuration of cloud computing, where a single function is distributed to multiple devices via network and processed collaboratively. Also, the steps described in the above-described flowchart may be distributed among multiple devices and executed, besides being executed at a single device. Further, in a case where multiple processes are included in a single step, the multiple processes included in that single step may be distributed among multiple devices and executed, besides being executed at a single device.

Also, the advantages described in the present Specification are only exemplary and not restrictive, and there may be other advantages.

While an arrangement has been described in the present embodiment where the ISCR serving as the point-in-time information of the leading packet of the data-for-BBF is included in the BB header, the ISCR may be included in the data field of the BBF, either instead of in the BB header or along with the BB header.

Further, an arrangement may be made where the ISCR to be included in the BB header is not the ISCR of the leading packet in the data-for-BBF but rather is the ISCR of another packet (e.g., second packet, last packet, etc.).

GSE-HEM Stipulations in DVB-S2X

The following is a description regarding GSE-HEM stipulated in the DVB-S2X standard "Digital Video Broadcasting (DVB); Second generation framing structure, channel coding and modulation systems for Broadcasting, Interactive Services, News Gathering and other broadband satellite applications Part II: S2-Extensions (DVB-S2X)—(Optional) DVB Document A83-2 March 2014", which extends DVB-S2.

4.3 System Configurations (see Part I, clause 4.3)

Table 1 associates the S2X system elements to the applications areas. All elements in Table 1 are optional in transmitting and receiving equipment complying with the S2 specification. At least "Normative" subsystems and functionalities shall be implemented in the transmitting and receiving equipment to comply with the S2X specification for a specific application area.

Within the present Annex, a number of configurations and mechanisms are defined as "Optional". Configurations and mechanisms explicitly indicated as "optional" within the present Annex, for a given application area, need not be implemented in the equipment to comply with the S2X specification. Nevertheless, when an "optional" mode or mechanism is implemented, it shall comply with the specification as given in the present document.

FIGS. 15A and 15B illustrate Table 1 in the DVB-S2X Standard.

5.1.6 Base-Band Header Insertion (see Part I, clause 5.1.6)

First byte (MATYPE-1):

TS/GS field (2 bits): Transport Stream Input, Generic Stream Input (packetized or continuous) or GSEHEM.

SIS/MIS field (1 bit): Single Input Stream or Multiple Input Stream.

CCM/ACM field (1 bit): Constant Coding and Modulation or Adaptive Coding and Modulation (VCM is signaled as ACM).

ISSYI (1 bit), (Input Stream Synchronization Indicator): If ISSYI=1=active, the ISSY field (see annex D) is inserted after UPs or in the baseband header in GSE-HEM For TS input mode:

NPD (1 bit): Null-packet deletion active/not active.

For GSE/Generic Continuous/Generic Packetized modes:

GSE-Lite (1 bit): GSE stream is GSE-Lite compliant/non-compliant

RO (2 bits): Transmission Roll-off factor (α). Three additional roll-off factors shall be available, 0.15; 0.10 and 0.05. Signaling shall be according to the following rule (Table 1[sic: should be revised as Table 2]):

If RO bits are signaled consistently from BBHEADER to BBHEADER as either 00, 01, 10 the backward compatible definition (High roll-off range) applies:

00=0.35
01=0.25
10=0.20

If RO bits are signaled from BBHEADER to BBHEADER in an alternating way with 11 then their interpretation shall be Low roll-off range:

00=0.15
01=0.10
10=0.05

It shall be ensured that the in a Multiple Input Stream configuration (SIS/MIS field=0) alternation is unambiguously evident over all Input Streams (for every ISI) and MODCOD combinations, such that any receiver will receive regular alternation. Any receiver, once locked will switch to low roll-off range on first detection of '11'.

FIG. 16 illustrates Table 2 in the SVB-S2X Standard.

5.1.7 GSE High Efficiency Mode (GSE-HEM)

GSE variable-length or constant length UPs may be transmitted in GSE-HEM. In GSE-HEM, slicing of GSE packets is performed and SYNCD shall always be computed. The receiver may derive the length of the UPs from the packet header, therefore UPL transmission in BBHEADER is not performed. UPs shall not be sliced when there is a BBFRAME from a different stream following, splitting is only possible with the immediately following BBFRAME. The optional ISSY field is transmitted in the BBHEADER.

The Mode Adaptation unit shall perform the following sequence of operations (see FIG. 1):

Optional input stream synchronization (see Part I, Annex D.2) relevant to the first transmitted UP which starts in the data field; ISSY field inserted in the UPL and SYNC fields of the BBHEADER.

Null-packet Deletion and CRC-8 at UP level shall not be computed nor inserted.

SYNCD computation (pointing at the first bit of the first transmitted UP which starts in the Data Field) and storage in BBHEADER. The transmitted UP corresponds exactly to the original UP itself. Hence SYNCD points to the first bit of the original UP.

UPL not computed nor transmitted.

GSE-Lite compliance of the stream shall be signaled in the 6th bit of the MATYPE-1 field. GSE-Lite=1 means a GSE-Lite compliant signal is transmitted. GSE-Lite=0 means that the transmitted GSE stream may not meet the definition of a GSE-Lite signal.

Figure 17:
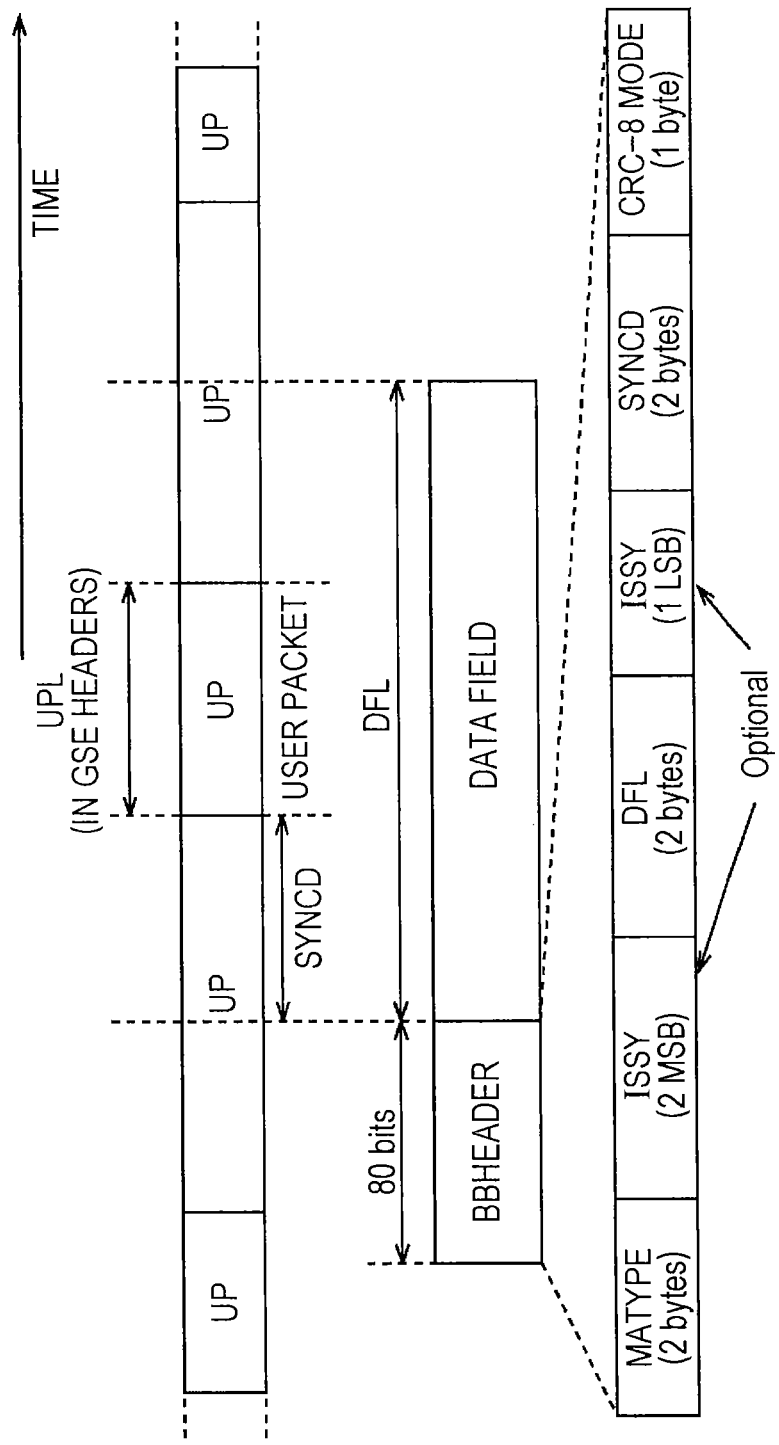
FIG. 17 is a diagram illustrating FIG. 1 in the DVB-S2X standard.

FIG. 17 illustrates FIG. 1 in the DVB-S2X Standard.

5.1.8.3. Channel Bonding for GSE Transmission

Generic Stream Encapsulation (GSE) [2] is an extremely flexible method to transmit any kind of data, including popular formats such as IP packets or TS packets where the data can be of fixed or variable length. GSE can be used for bonded channels to support a higher data rate than can be carried in a single RF channel. A maximum of L channels (L<=3) is supported. The number of bonded transponders and associated information is signaled in the GSE-LLC tables according to [2]. These GSE-LLC tables shall be transmitted in parallel over each of the bonded transponders. To ensure maximum efficiency in S2X, it is recommended to use GSE-HEM (see clause 5.1.7). The following describes the use of channel boding in GSE-HEM.

Channel bonding for GSE transmission is similar to the TS method of bonding described in clause 5.1.8.2, using the ISCR timing data in the ISSY field to allow the receiver to align packets from different RF channels (see Part I, Annex D for ISSY details). However ISSY is not added per UP, but per baseband frame (BBFRAME). ISSY shall always be used for bonded GSE channels. In the ISSY field, ISCR shall be transmitted every BBFRAME. BUFS and BUFSTAT shall not be transmitted.

At the modulator, input UPs (GSE packets) are continuously added to the Data Field of a single BBFRAME until it is complete. Appropriate ISSY information is added to the baseband frame header (BBHEADER) of each BBFRAME. ISSY information refers to the first transmitted UP which starts in the Data Field. UPs shall be transparently sliced between BBFRAMEs on different RF channels as necessary—it is not required to slice UPs on BBFRAMEs using the same RF channel. The order of input UPs must be maintained in the bonding process. Each BBFRAME is constructed with a length that is derived according to the modulation and coding parameters for that RF channel. Each RF channel may have different modulation and coding parameters. In order to reduce buffering requirements, BBFRAMEs shall be created for each RF channel according to the ratio of the bitrate of each RF channel. For example if the bitrates of two bonded RF channels are equal, BBFRAMEs for each RF channel shall occur in alternating fashion.

An example of the transmission of bonded GSE channels is shown in FIG. 3 below.

At the receiver side, each GSE bonded RF channel is demodulated according to the modulation and coding parameters for that RF channel. An example diagram is shown in FIG. 4.

The output from each demodulator is then combined at the Merger using the ISSY information contained in the BBHEADER of each BBFRAME. The ISSY information provides the timing information to recover the order of the BBRAMES from different demodulators. Since ISSY information applies to each BBFRAME, and the packet order of UPs within each BBFRAME is maintained, the overall order of UPs is maintained at the Merger output. Split UPs are reconstructed in the Merger.

In comparison to the TS method, the output bitrate of each demodulator is no greater than the bitrate of the channel, which can significantly reduce the processing burden at the Merger. Furthermore, since ISSY information need only be processed per BBFRAME, the merging operation processing burden is also reduced. A maximum tolerance of one BBFRAME of delay shall be allowed between the different receivers.

After merging, additional processing such as filtering of GSE packets, output of IP or TS packets rather than GSE packets, and so on may be undertaken at the receiver as necessary.

For Generic Packetized streams, ISSY must be added on a per packet basis the same as for TS channel bonding. CRC-8 shall be added per packet, as described in Part I clause 5.1.5. SYNCD shall be computed and point to the first bit of the CRC-8 of the previous UP. Packets shall only be split on the same RF channel.

For Generic Continuous streams using GSE, ISSY must be added on a per packet basis the same as for TS channel bonding. CRC-8 computation shall not be performed. SYNCD shall be computed and point to the first transmitted UP in the Data Field. The UPL field may contain proprietary signaling, including information about channel bonding, otherwise the UPL field shall be set to 0. GSE Packets shall only be split on the same RF channel.

Figure 18:
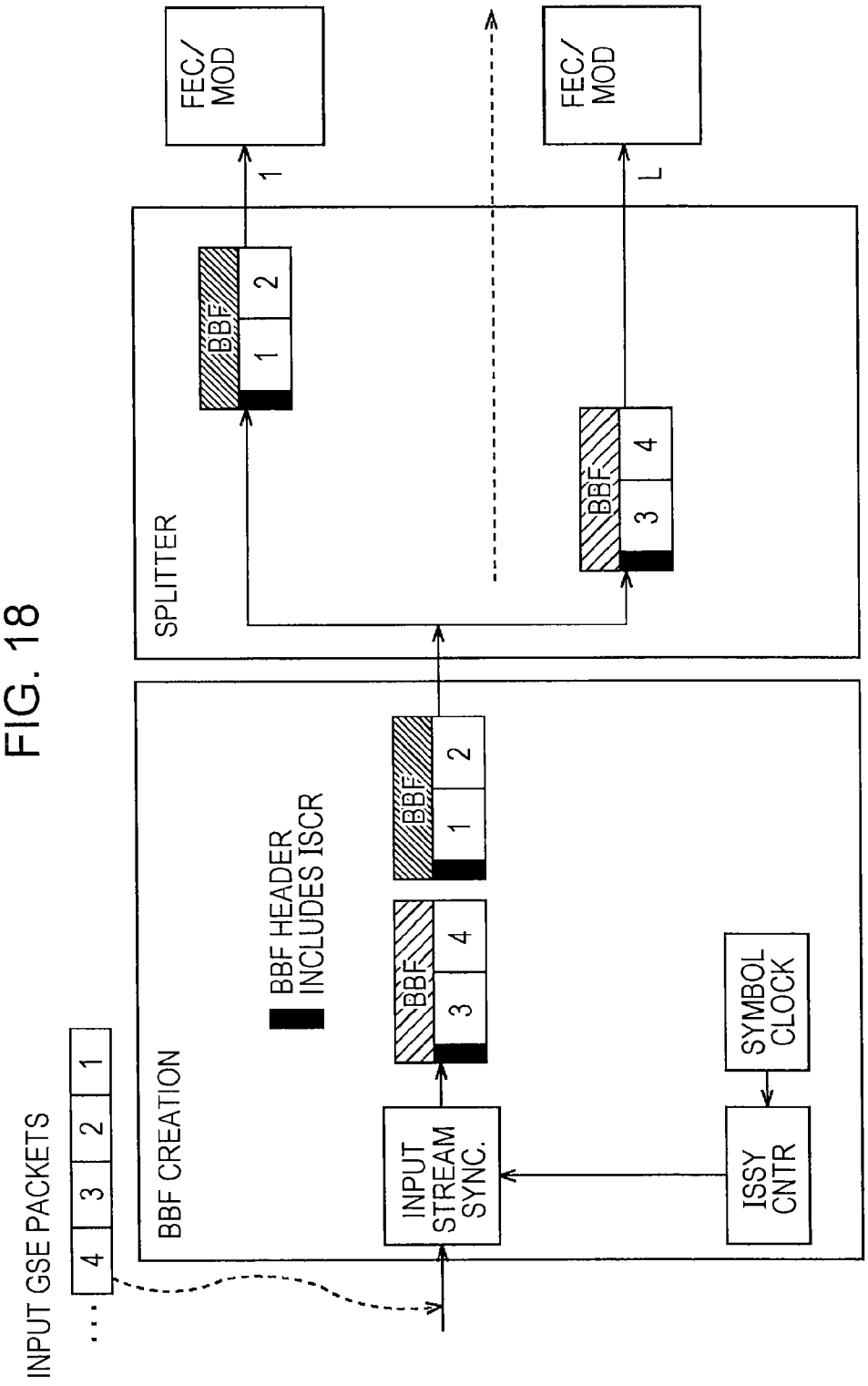
FIG. 18 is a diagram illustrating FIG. 3 in the DVB-S2X standard.
Figure 19:
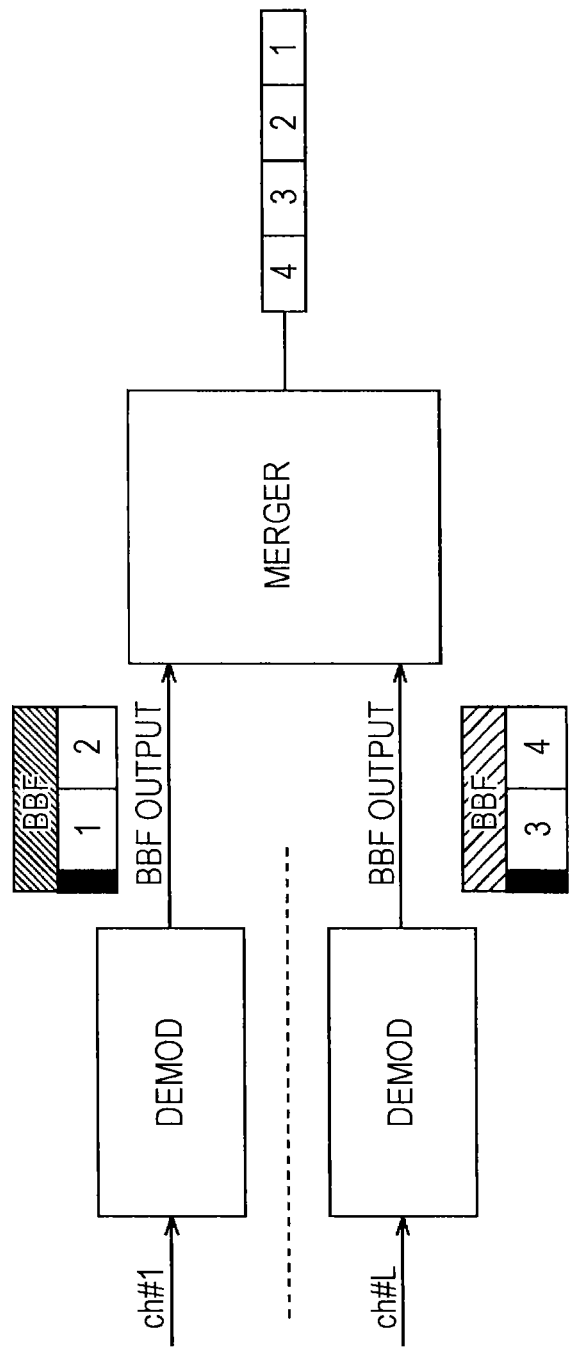
FIG. 19 is a diagram illustrating FIG. 4 in the DVB-S2X standard.

FIG. 18 illustrates FIG. 3 in the DVB-S2X Standard, and FIG. 19 illustrates FIG. 4.

The present technology may also assume the following configurations.

(1) A data processing device including:
a splitter configured to split an input stream made up of a plurality of packets, so as to generate split streams of a plurality of channels, of which the smallest increment is base band frames (BBFs) where the packets of the input stream are placed in consecutive order in a data field of the BBF which is the object of forward error correction (FEC).

(2) The data processing device according to (1), further including:
a generating unit configured to generate point-in-time information representing point-in-time;
wherein the BBFs include the point-in-time information added to the packets placed in the BBFs.

(3) The data processing device according to (2),
wherein base band (BB) headers of the BBFs include the point-in-time information of leading packets placed in the BBFs.

(4) The data processing device according to (3),
wherein the point-in-time information is an input stream synchronizer (ISSY) stipulated in DVB-S2;
and wherein an UPL field and a SYNC field of the BB header in the BBF stipulated in DVB-S2 are used as fields to place the ISSY.

(5) The data processing device according to (4),
wherein the splitter
adds the point-in-time information to each packet, and
deletes the point-in-time information of the packets placed in the BBFs while including the point-in-time information of the leading packets placed in the BBFs in the BB headers of the BBFs.

(6) The data processing device according to any one of (1) through (5),
wherein the splitter
splits the input stream into the split streams, in increments of data-for-BBF to be placed in BBFs, and
generates BBFs where the data-for-BBF of the split streams has been placed.

(7) The data processing device according to any one of (1) through (5),
wherein the splitter
generates the BBFs from the input stream, and
splits the input stream into the split streams in increments of the BBFs.

(8) The data processing device according to any one of (1) through (7),
wherein the input stream is any one of a Transport Stream (TS), a Generic Continuous Stream (GCS), a Generic Stream Encapsulation (GSE) packet stream, a GSE-Lite packet stream, and an Internet Protocol (IP) packet stream.

(9) A data processing method including:
splitting an input stream made up of a plurality of packets, so as to generate split streams of a plurality of channels, of which the smallest increment is base band frames (BBFs) where the packets of the input stream are placed in consecutive order in a data field of the BBF which is the object of forward error correction (FEC).

(10) A data processing device including:
a reconstructing unit configured to reconstruct an input stream from split streams of a plurality of channels transmitted from a transmission device which splits the input stream made up of a plurality of packets, so as to generate the split streams of the plurality of channels, of which the smallest increment is base band frames (BBFs) where the packets of the input stream are placed in consecutive order in a data field of the BBF which is the object of forward error correction (FEC).

(11) The data processing device according to (10),
wherein the transmission device generates point-in-time information representing point-in-time;
wherein the BBFs include the point-in-time information added to the packets placed in the BBFs;
and wherein the reconstructing unit reconstructs the input stream from the split streams of the plurality of channels, based on the point-in-time information.

(12) The data processing device according to (11),
wherein base band (BB) headers of the BBFs include the point-in-time information of leading packets placed in the BBFs;
and wherein the reconstructing unit reconstructs the input stream from the split streams of the plurality of channels, based on the point-in-time information included in the BB headers.

(13) The data processing device according to (12),
wherein the point-in-time information is an input stream synchronizer (ISSY) stipulated in DVB-S2;
and wherein an UPL field and a SYNC field of the BB header in the BBF stipulated in DVB-S2 are used as fields to place the ISSY.

(14) The data processing device according to any one of (10) through (13),
wherein the input stream is any one of a Transport Stream (TS), a Generic Continuous Stream (GCS), a Generic Stream Encapsulation (GSE) packet stream, a GSE-Lite packet stream, and an Internet Protocol (IP) packet stream.

(15) A data processing method including:
reconstructing an input stream from split streams of a plurality of channels transmitted from a transmission device which splits the input stream made up of a plurality of packets, so as to generate the split streams of the plurality of channels, of which the smallest increment is base band frames (BBFs) where the packets of the input stream are placed in consecutive order in a data field of the BBF which is the object of forward error correction (FEC).

It should be understood by those skilled in the art that various modifications, combinations, sub-combinations and alterations may occur depending on design requirements and other factors insofar as they are within the scope of the appended claims or the equivalents thereof.

What is claimed is:

1. A data processing device comprising:
circuitry configured to
receive an input stream made up of a plurality of packets;
after receiving the input stream, add to an end of each packet of the plurality of packets of the received input stream an input stream synchronizer (ISSY) indicating packet transmission point-in-time;
after adding the ISSY, generate a BB header including the ISSY added to a leading packet which is a packet out of the packets making up data-for-base band frame (BBF), wherein the data-for-BBF being data placed in the data field of the BBF;
delete the ISSY added to the packets making up the data-for-BBF;
add the BB header to the data-for-BBF and sequentially extract data-for-BBF of consecutive packets from the input stream after deleting the ISSY, the BBF being a smallest increment to be subjected to forward error correction (FEC), the BBF having a Base Band (BB) header and a data field;
after generating the BBF, split a stream of the generated BBFs into split streams of a plurality of channels;
after splitting the stream of the generated BBFs, perform the FEC on each of the BBF of each of the split streams;
after performing the FEC into symbols, convert each of the split streams;
after converting each of the split streams, perform an orthogonal modulation to each of the symbols to generate modulation signals; and
after performing the orthogonal modulation, transmit each of the modulation signals.

2. The data processing device according to claim 1,
wherein an User Packet Length (UPL) field and a SYNC field of the BB header in the BBF stipulated in DVB-S2 are used as fields to place the ISSY.

3. The data processing device according to claim 2,
wherein the input stream is any one of a Transport Stream (TS), a Generic Continuous Stream (GCS), a Generic Stream Encapsulation (GSE) packet stream, a GSE-Lite packet stream, and an Internet Protocol (IP) packet stream.

4. The data processing device according to claim 1,
wherein the ISSY is an Input Stream Time Reference (ISCR).

5. A data processing method comprising:
receiving an input stream made up of a plurality of packets;
after receiving the input stream, adding to an end of each packet of the plurality of packets of the received input stream an input stream synchronizer (ISSY) indicating packet transmission point-in-time;
after adding the ISSY, generating, using circuitry, a BB header including the ISSY added to a leading packet which is a packet out of the packets making up data-for-base band frame (BBF), wherein the data-for-BBF being data placed in the data field of the BBF;
deleting the ISSY added to the packets making up the data-for-BBF;
adding the BB header to the data-for-BBF and sequentially extracting data-for-BBF of consecutive packets from the input stream after deleting the ISSY, the BBF being a smallest increment to be subjected to forward error correction (FEC), the BBF having a Base Band (BB) header and a data field;
after generating the BBF, splitting a stream of the generated BBFs into split streams of a plurality of channels;
after splitting the stream of the generated BBFs, performing the FEC on each of the BBF of each of the split streams;
after performing the FEC into symbols, converting each of the split streams;
after converting each of the split streams, performing an orthogonal modulation to each of the symbols to generate modulation signals; and
after performing the orthogonal modulation, transmitting each of the modulation signals.

* * * * *